(12) United States Patent
Limaye et al.

(10) Patent No.: US 9,537,761 B2
(45) Date of Patent: Jan. 3, 2017

(54) IP ADDRESS ALLOCATION IN SPLIT BRAIN ICR SCENARIO

(71) Applicant: Telefonaktiebolaget L M Ericsson (publ), Stockholm (SE)

(72) Inventors: Namrata Limaye, Fremont, CA (US); Juan Lu, Sunnyvale, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 185 days.

(21) Appl. No.: 13/935,200

(22) Filed: Jul. 3, 2013

(65) Prior Publication Data

US 2014/0313881 A1 Oct. 23, 2014

Related U.S. Application Data

(60) Provisional application No. 61/813,537, filed on Apr. 18, 2013.

(51) Int. Cl.
*H04L 12/703* (2013.01)
*H04L 29/12* (2006.01)

(52) U.S. Cl.
CPC ........... *H04L 45/28* (2013.01); *H04L 61/2007* (2013.01); *H04L 61/6068* (2013.01)

(58) Field of Classification Search
CPC ............ H04L 1/22; H04L 1/24; H04L 49/552; G06F 11/08
See application file for complete search history.

(56) References Cited

U.S. PATENT DOCUMENTS

| | | | | |
|---|---|---|---|---|
| 7,032,029 | B1* | 4/2006 | Tanzman et al. | 709/245 |
| 7,269,648 | B1* | 9/2007 | Krishnan et al. | 709/224 |
| 7,336,622 | B1* | 2/2008 | Fallis et al. | 370/252 |
| 7,409,706 | B1* | 8/2008 | O'Rourke et al. | 726/11 |
| 7,593,346 | B2* | 9/2009 | McLaggan et al. | 370/252 |
| 8,553,532 | B2* | 10/2013 | Bajamahal | 370/217 |
| 2007/0116020 | A1* | 5/2007 | Cheever et al. | 370/401 |
| 2007/0253328 | A1* | 11/2007 | Harper et al. | 370/219 |
| 2009/0287955 | A1* | 11/2009 | Matsumoto et al. | 714/4 |
| 2013/0258839 | A1* | 10/2013 | Wang et al. | 370/221 |

* cited by examiner

*Primary Examiner* — Anh-Vu Ly
*Assistant Examiner* — Hector Reyes Ortiz
(74) *Attorney, Agent, or Firm* — Nicholson De Vos Webster & Elliott LLP

(57) ABSTRACT

According to one embodiment, a method for allocating Internet Protocol (IP) addresses includes receiving, while serving as an active inter-chassis redundancy (ICR) device, a plurality of IP address requests from the third network device for the plurality of client devices. The method further includes responsive to determining a second network device is also serving as the active ICR device, allocating to a client device an IP address selected from a first portion of the commonly shared plurality of IP addresses and not a second portion, wherein the first portion is allocatable only by the first network device while the first network device and the second network device are both serving as active ICR network devices in the ICR system, and wherein the second portion is allocatable only by the second network device while the first and second network devices are both serving as active ICR devices.

20 Claims, 16 Drawing Sheets

*Active/Standby State*

*Active/Standby State*

*Active/Active State*

*Active/Active State*

*Active/Active State*

(Enhanced Allocation Algorithm)

*(Enhanced Allocation Algorithm)*

*Active/No-Peer State*

Active/No-Peer State

*Active/No-Peer State*

IP ADDRESS ALLOCATION IN SPLIT BRAIN ICR SCENARIO

CROSS-REFERENCE TO RELATED APPLICATIONS

This present application claims the benefit of U.S. Provisional Application Ser. No. 61/813,537, filed on Apr. 18, 2013, and this provisional application is hereby incorporated herein by reference.

FIELD

Embodiments of the present invention relate generally to packet networks. More particularly, this invention relates to Internet Protocol (IP) address allocation in split brain inter-chassis redundancy systems.

BACKGROUND

In communication networks, it is generally desirable to prevent service outages and/or loss of network traffic. By way of example, such service outages and/or loss of network traffic may occur when a network device fails, loses power, is taken offline, is rebooted, a communication link to the network device breaks, etc.

In order to prevent such service outages and/or loss of network traffic, the communication networks may utilize inter-chassis redundancy (ICR). In an ICR system, there are typically two ICR devices (i.e., nodes). During normal operation, one ICR device is configured to be in active state while the other is configured to be in standby state. The active ICR device is responsible for handling network traffic with a plurality other network devices, including, for example, allocating Internet Protocol (IP) addresses to such other network devices.

Each ICR device maintains a local IP pool of IP addresses that can be allocated to such other network devices. Typically, when an active ICR device receives a request for an IP address, it selects from the local IP pool an unallocated IP address, and sends it to the requesting network device. The active ICR device then updates a local IP pool record to indicate that the respective IP address in the IP pool has been allocated and is no longer available for use. The active ICR device also communicates with the standby ICR device to inform the standby ICR device of the IP address that has been allocated. The standby ICR device uses this syncing information to update its local IP pool record, such that both IP pools mirror each other. This helps to prevent the standby ICR device from allocating an IP address that has already been allocated when the standby ICR device transitions to active state.

There are cases where the communication between the ICR devices to sync their IP pools does not provide adequate protection against both ICR devices allocating the same IP address to multiple network devices. For example, both ICR devices may sometimes be (erroneously or otherwise) configured to be active ICR devices. In such a case, IP address requests may be received by an ICR device before the syncing information can be received and processed to sync the IP pool. Another situation is when the communication channel itself is impaired, and syncing information is never received. In such cases, there is a possibility that the same IP address may be allocated by both ICR devices because their IP pools are not synced.

SUMMARY

Exemplary methods for allocating IP addresses include receiving, while serving as an active ICR network device in the ICR system, a plurality of IP address requests from a third network device for a plurality of client devices. The exemplary methods further include, responsive to determining the second network device is serving as a standby ICR network device in the ICR system, allocating to a first client device of the plurality of client devices a first IP address selected from a common plurality of IP addresses that are allocatable by whichever one of the first network device and the second network device is currently serving as the active ICR network device while the other one of the first network device and the second network device is currently serving as the standby ICR network device. In one embodiment, the methods include responsive to determining the second network device is also serving as the active ICR network device in the ICR system, allocating to a second client device of the plurality of client devices a second IP address selected from a first portion of the commonly shared plurality of IP addresses and not a second portion of the commonly shared plurality of IP addresses, wherein the first portion of the commonly shared plurality of IP addresses is allocatable only by the first network device while the first network device and the second network device are both serving as active ICR network devices in the ICR system, and wherein the second portion of the commonly shared plurality of IP addresses is allocatable only by the second network device while the first network device and the second network device are both serving as active ICR network devices in the ICR system.

Exemplary methods for allocating IP addresses include receiving, while serving as an active ICR network device in the ICR system, a plurality of IP address requests from the third network device for the plurality of client devices. The exemplary methods further includes responsive to determining the synchronization channel is functioning properly, allocating to a first client device of the plurality of client devices a first IP address selected from a common plurality of IP addresses that are allocatable by whichever one of the first network device and the second network device is currently serving as the active ICR network device while the synchronization channel is functioning properly. In one embodiment, the methods include responsive to determining the synchronization channel is not functioning properly, allocating to a second client device of the plurality of client devices a second IP address selected from a first portion of the commonly shared plurality of IP addresses and not a second portion of the commonly shared plurality of IP addresses, wherein the first portion of the commonly shared plurality of IP addresses is allocatable only by the first network device while the first network device is serving as the active ICR network device of the ICR system when the synchronization channel is not functioning properly, and wherein the second portion of the commonly shared plurality of IP addresses is allocatable only by the second network device while the second network device is serving as the active ICR network device of the ICR system when the synchronization channel is not functioning properly.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1A:
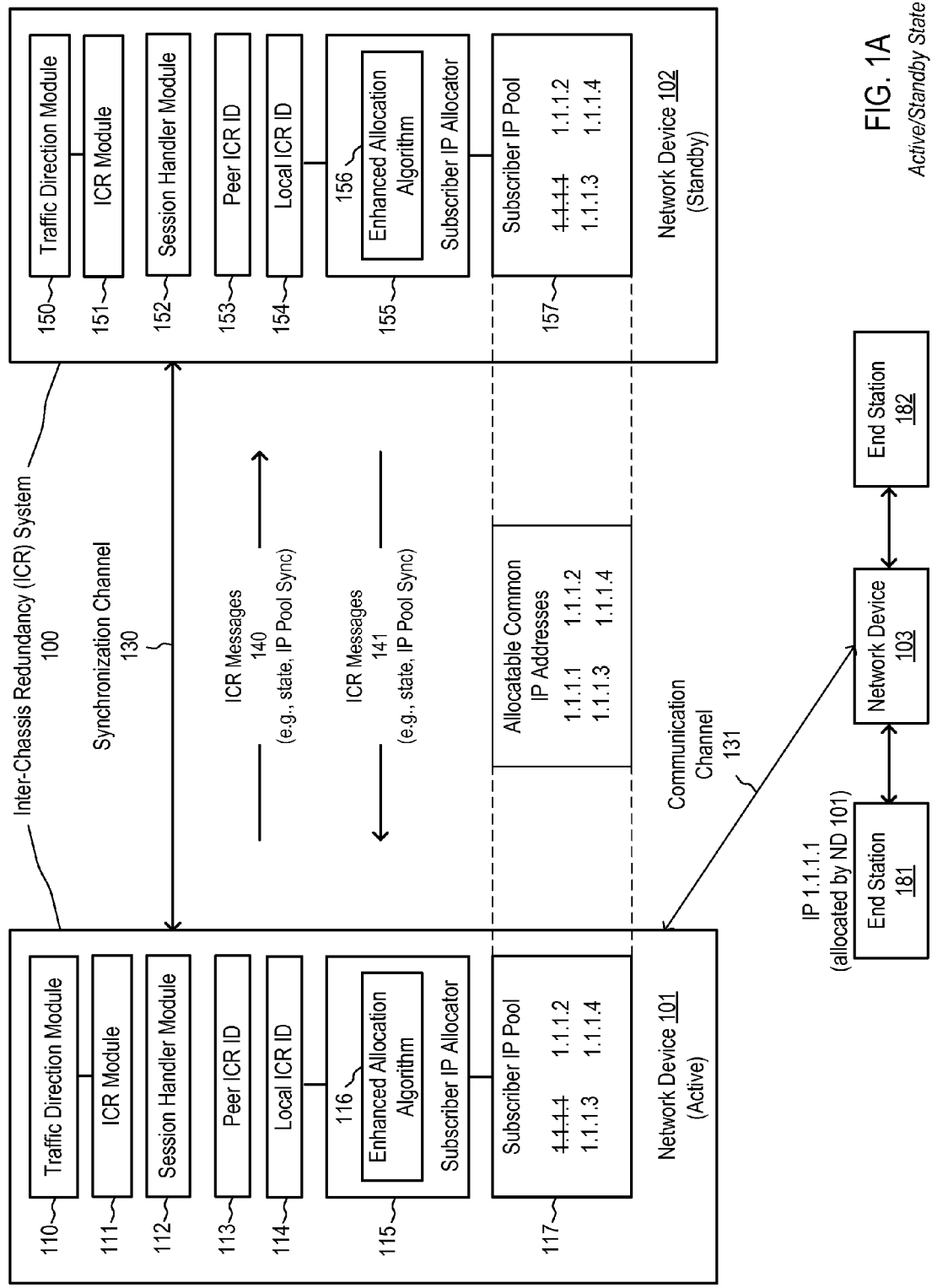
FIG. 1A is a block diagram illustrating an inter-chassis redundancy (ICR) system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

As used herein, a network interface may be physical or virtual; and an interface address is an IP address assigned to a network interface, be it a physical network interface or virtual network interface. A physical network interface is hardware in a network device through which a network connection (i.e., session) is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Figure 1B:
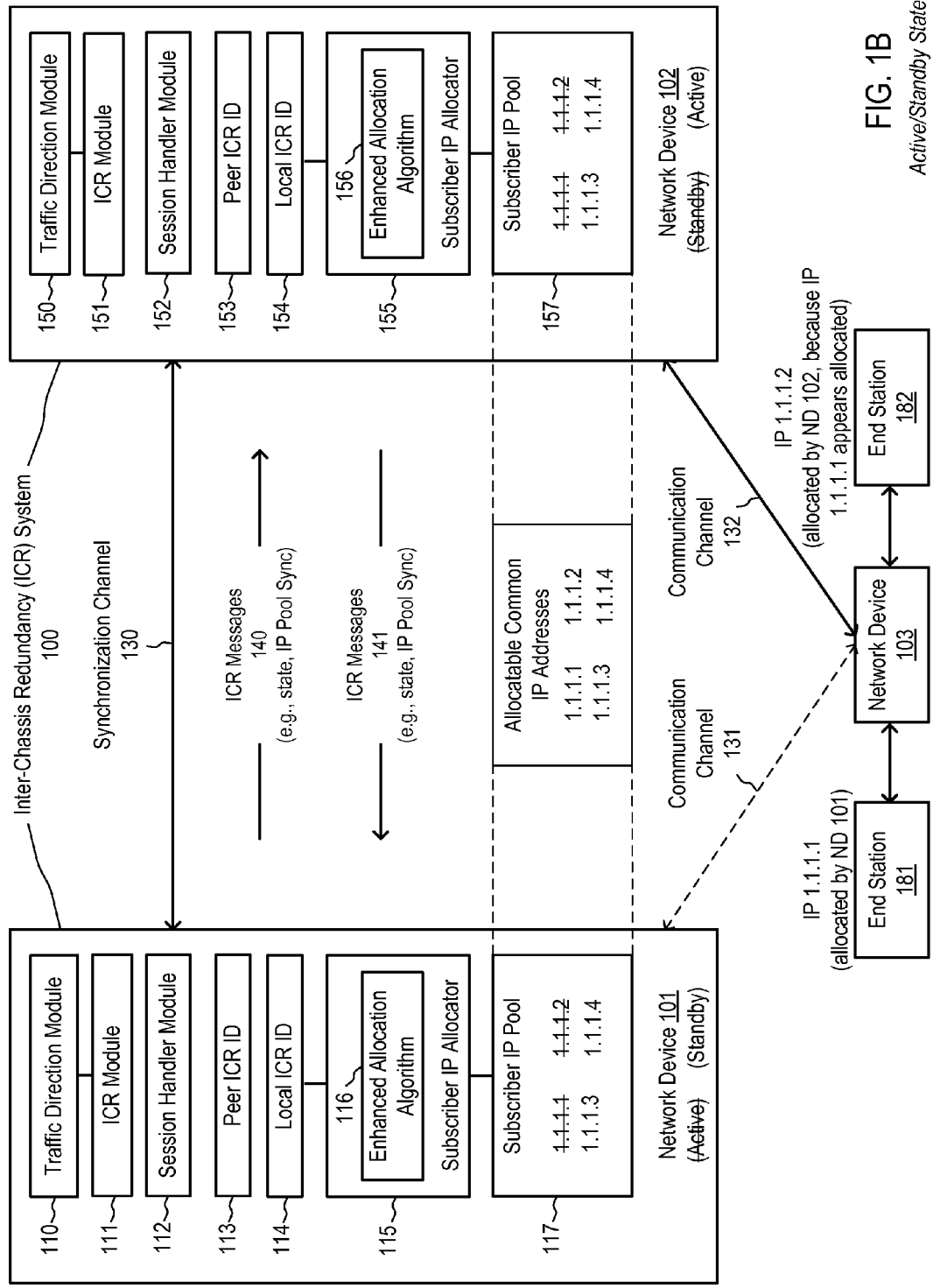
FIG. 1B is a block diagram illustrating an inter-chassis redundancy (ICR) system according to one embodiment.

FIGS. 1A and 1B are block diagrams illustrating ICR system 100 according to one embodiment. FIG. 1A illustrates network devices 101 and 102 are serving as active and standby ICR devices, respectively. FIG. 1A illustrates network device 103 communicatively coupled to network device 101 over communication channel 131. FIG. 1B illustrates network devices 101 and 102 have switched roles, such that network devices 101 and 102 serve as standby and active ICR devices, respectively. This is shown as "(Active) (Standby)" in network device 101 and "(Standby) (Active) in network device 102. FIG. 1B illustrates network device 103 communicatively coupled to network device 102 over communication channel 132.

Referring now to FIG. 1A. ICR system 100 includes network device 101 and 102. FIG. 1A illustrates by way of example and not limitation, network device 101 and 102 configured to be active and standby ICR network devices, respectively. This configuration shall herein be referred to as the active/standby state configuration. Network devices 101 and 102, however, can switch roles as described in further details below. ICR system 100 is communicatively coupled to network device 103, which can be a router, switch, etc. Subscriber end stations 181-182 can establish connections (e.g., sessions) with ICR system 100 through network device 103. Subscriber end stations 181-182 can be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc.

ICR system 100 helps to prevent, or at least reduce, service outages and/or loss of network traffic when the various different types of failure events occur (e.g., software process crashes and/or failure of one or more backed up hardware resources within the chassis of network devices 101 or 102). The resilience and/or the switchover of active roles between network devices 101 and 102 can be transparent to end stations 181-182. End stations 181-182 may not be aware, or not need to be aware, that they are connecting to a different network device when a switchover event occurs.

In some embodiments, ICR system 100 represents a geographically distributed ICR system to provide geographical redundancy of session or network traffic data. Network devices 101 and 102 can reside at different geographical locations (e.g., locations at least several miles apart, different towns or cities, different states, different countries, etc.). Such a geographically distributed ICR system helps to prevent, or at least reduce, service outages and/or loss of network traffic, when geographically localized disruption of service occurs (e.g., due to catastrophic weather, local loss of power, or other geographically localized events occurring at one but typically not both geographical locations).

Network devices 101 and 102 include traffic direction modules 110 and 150, respectively. Traffic direction modules 110 and 150 are configured to send traffic attributes to network device 103 that can influence whether network device 103 routes traffic to network device 101 or 102. For example, traffic direction module 110 can send traffic attributes that are more favorable than those sent by traffic direction module 150, thus influencing (i.e., attempting to cause) network device 103 to route network traffic to network device 101 rather network device 102. As used herein, "more" or "less" favorable are relative terms, describing the traffic attributes of the sending ICR network device relative to the peer ICR device.

Traffic direction modules 110 and 150 can be implemented as one of various routing protocols, such as Border Gateway Protocol (BGP), Interior Gateway Protocol(s) (e.g., Open Shortest Path First (OSPF), Routing Information Protocol (RIP), Intermediate System to Intermediate System (IS-IS), Label Distribution Protocol (LDP), Resource Reservation Protocol (RSVP), etc. Regardless of which routing protocol is utilized, traffic direction modules 110 and 150 are configured to communicate with and provide routing information to network device 103 to enable network device 103 to decide whether to route network traffic (originating from or terminating at end stations 181-182) to/from network device 101 or network device 102.

By way of example, in an embodiment where traffic direction modules 110 and 150 are implemented as BGP modules, there are different mechanisms to influence the routing decision. In some embodiments, Autonomous System (AS) path length may be used to influence the routing decision (e.g., a network device serving as a standby ICR network device can advertise an AS path length that is longer than an AS path length advertised by the active ICR network device). In some embodiments, relatively more AS path prepends can be used by the standby ICR network device while less AS path prepends can be used by the active ICR network device. In general, a route having more AS path prepends tends to be less desirable than a route having fewer AS path prepends. Use of AS path prepends allows both ICR network devices to have the same prefixes, but only have traffic routed to the network device having fewer AS path prepends. As illustrated in FIG. 1, traffic direction modules 110 and 150 have provided routing information to network device 103 such that network device 103 has decided to route network traffic to network device 101 over communication channel 131.

Network devices 101 and 102 include ICR modules 111 and 151, respectively. ICR modules 111 and 151 are configured to cause traffic direction modules 110 and 150, respectively, to send traffic attributes to network device 103 based on the current state of the ICR device. By way of example, as illustrated in FIG. 1, initially ICR module 111 causes traffic direction module 110 to send traffic attributes that are more favorable than traffic attributes sent by traffic direction module 150 because network device 101 is serving as the active ICR device. By sending more favorable traffic attributes, ICR module 111 attempts to cause network device 103 to route network traffic to network device 101 while it is serving as an active ICR device. Subsequently, ICR module 151 causes traffic direction module 150 to send traffic attributes that are less favorable than traffic attributes sent by traffic direction module 110 because network device 102 is serving as the standby ICR device. By sending less favorable traffic attributes, ICR module 151 attempts to cause network device 103 to route network traffic away from network device 102 while it is serving as a standby ICR device.

ICR modules 111 and 151 are configured to exchange ICR messages 140-141 over synchronization channel 130. ICR messages 140-141 can include information relating to the state of the sending ICR network device. By way of example, ICR messages 140 can include information to notify network device 102 that network device 101 is serving as an active or standby ICR device, and ICR messages 141 can include information to notify network device 101 that network device 102 is serving as a active or standby ICR device. Such ICR messages shall herein be referred to as ICR state messages. ICR messages 140-141 can also include information to enable network devices 101 and 102 to sync their respective subscriber IP pools 117 and 157, described in further details below. Such ICR messages shall herein be referred to as IP pool sync ICR messages. ICR messages 140-141 can be exchanged using various protocols such as User Datagram Protocol (UDP), Transmission Control Protocol (TCP), and other packet transmission protocols known in the art.

Network devices 101 and 102 include session handler modules 112 and 152, respectively. Session handler 112 is configured to handle network sessions that may have been established with end stations 181 and/or 182, while network device 101 is serving as an active ICR device. Session handler 152 is configured to handle network sessions that may have been established with end stations 181 and/or 182, while network device 102 is serving as an active ICR device. The type of session handler module varies depending upon the particular implementation of the ICR system (e.g., the network in which it is deployed, etc.). In some embodiments, as will be explained further below, ICR system 100 can be deployed in a mobile backhaul (e.g., a Long Term Evolution (LTE) wireless network), in which case, session handler modules 112 and 152 can be Evolved Packet Core (EPC) modules (e.g., configured to implement Serving Gateway and/or Packet Data Network (PDN) Gateway functionalities).

In one embodiment, network devices 101 and 102 include local ICR identifiers (IDs) 114 and 154, respectively. Local ICR ID 114 contains the ID of network device 101 and local ICR ID 154 contains the ID of network device 102. In one embodiment, these IDs are configurable by a system administrator through a command line interface (CLI) (not shown). In one embodiment, network devices 101 and 102 include peer ICR IDs 113 and 153, respectively. Peer ICR ID 113 contains the ID of network device 102. For example, peer ICR ID 113 can be populated with the ID stored in local ICR ID 154 that is sent by network device 102 to network device 101 as part of ICR messages 141 over synchronization channel 130. Alternatively, or in addition to, peer ICR ID 113 can be configured by a system administrator through the CLI. Peer ICR ID 153 contains the ID of network device 101. For example, peer ICR ID 153 can be populated with the ID stored in local ICR ID 114 that is sent by network device 101 to network device 102 as part of ICR messages 140 over synchronization channel 130. Alternatively, or in addition to, peer ICR ID 153 can be configured by a system administrator through the CLI. In one embodiment, local ICR IDs 114 and 154, and peer ICR IDs 113 and 153 are implemented as IP addresses.

In one embodiment, network devices 101 and 102 include subscriber IP pools (which shall herein be referred to simply as IP pools) 117 and 157, respectively. IP pools 117 and 157 are configured to store a plurality of allocatable common IP addresses. The plurality of allocatable common IP addresses are IP addresses that network devices 101 and 102 can allocate to end stations 181-182 through network device 103. As illustrated in FIG. 1A, IP pools 117 and 157 have been configured (e.g., by a system administrator) to include IP addresses {1.1.1.1, 1.1.1.2, 1.1.1.3, 1.1.1.4}. Although only four IP addresses are illustrated, one having ordinary skill in the art would recognize that more or less IP addresses can be included as part of the allocatable common IP addresses.

In one embodiment, network devices 101 and 102 include subscriber IP allocators (which shall herein be simply referred to as IP allocators) 115 and 157, respectively. In one embodiment, IP allocator 115 is configured to receive IP requests from network device 103, which may be requesting IP addresses for end stations 181-182. In response to receiving a request for an IP address from network device 103, IP allocator 115 is configured to select an available IP address from IP pool 117 and send it to network device 103. The selected IP address is considered allocated, and thus, no longer available for allocation.

In one embodiment, IP allocator 115 selects the next available IP address from IP pool 117 for allocation when an IP address request is received. As used herein, "next" can refer to the first available/unallocated IP address in IP pool 117. Of course, this can depend on how IP pool 117 is implemented. For example, if IP pool 117 is implemented as a linked-list of IP addresses, the "next" available IP address can be the first IP address in the list that is unallocated.

In some cases, selecting the "next" available IP address from IP pool 117 for allocation can result in the same IP address being allocated by the peer ICR device. These cases are discussed in further details below. In order to avoid allocating duplicate IP addresses in such cases, IP allocator 115 includes enhanced allocation algorithm 116. Enhanced allocation algorithm 116 overcomes the problem of allocating duplicate IP addresses by selecting unique IP addresses based on predetermined criteria, e.g., based on local ICR ID 114 and peer ICR ID 113, discussed in further details below.

In one embodiment, IP allocator 115 is configured to maintain an IP pool record of which IP addresses have been allocated in order to avoid the possibility of allocating the same IP address to multiple end stations. In one embodiment, the record of allocated IP addresses can be implemented as a bit array, such that each bit represents the availability of an IP address of the allocatable common IP addresses. In the illustration of FIG. 1, an array having four bits can be implemented to record the status of each of the four IP addresses. The use of an array as a record of which IP address have been allocated is discussed by way of example not limitation. One with ordinary skill in the art would recognize that other mechanisms can be implemented. For the sake of simplicity, throughout the description of this and other figures, a "strikethrough" is used to illustrate that an IP address has been marked as allocated.

In one embodiment, IP allocator 115 is configured to inform IP allocator 155 of the IP addresses that IP allocator 115 has allocated. In one embodiment, IP allocator 115 informs IP allocator 155 by sending IP pool sync messages (containing the allocated IP addresses) as part of ICR messages 140 to network device 102. IP allocator 155, in response to receiving these allocated IP addresses, updates its local IP pool record to indicate that the IP addresses have been allocated. Once both IP pool records are updated, IP pools 117 and 157 are synced, thus preventing the possibility of one ICR device allocating an IP address that has been previously allocated by the peer ICR device. IP allocator 155 and enhanced allocation algorithm 156 of network device 102 are configured to perform similar operations as IP allocator 115 and enhanced allocation algorithm 116, respectively. For the sake of brevity, these operations will not be discussed again.

IP allocation during the active/standby state, as illustrated in FIGS. 1A and 1B will now be discussed by way of example and not limitation. FIG. 1A illustrates that network device 101 and 102 are initially configured as active/standby ICR devices, respectively. Network device 103 has been influenced to route traffic to network device 101 over communication channel 131. Network device 103 receives a request for an IP address from end station 181. Network device 103 sends the IP request to network device 101 over communication channel 131. In response to receiving the IP address request, IP allocator 115 determines that the next available IP address in IP pool 117 is IP address 1.1.1.1. Accordingly, IP allocator 115 selects IP address 1.1.1.1 and allocates it to end station 181 by sending it to network device 103.

IP allocator 115 updates the local IP record to reflect that IP address 1.1.1.1 has been allocated. This is shown in FIG. 1A as "~~1.1.1.1~~" in IP pool 117. IP allocator 115 sends IP pool sync message(s) (containing IP address 1.1.1.1) as part of ICR messages 140 to inform IP allocator 155 that IP address 1.1.1.1 has been allocated. IP allocator 155 updates its local IP pool record to reflect that IP address 1.1.1.1 has been allocated. This is shown in FIG. 1A as "~~1.1.1.1~~" in IP pool 157. At this point, IP pools 117 and 157 are synced up, both containing unallocated IP addresses 1.1.1.2-1.1.1.4, as reflected by their respective IP pool records. Further, end station 181 has been assigned IP address 1.1.1.1.

Referring now to FIG. 1B. Subsequently, network devices 101 and 102 switch roles. Network device 101 switches from active to standby ICR device, and network device 102 switches from standby to active ICR device. This is shown in FIG. 1B as "~~(Active)~~ (Standby)" in network device 101, and "~~(Standby)~~ (Active)" in network device 102. The role switching event can be caused by various reasons, e.g., network devices 101 and 102 may have detected a link failure at communication channel 131. Regardless of the reason for switching roles, network device 101 sends less favorable traffic attributes to network device 103. Network device 102 sends more favorable traffic attributes to network device 103. Such traffic attributes cause network device 103 to re-direct its network traffic to network device 102 over communication channel 132. Communication channel 131 is no longer active (i.e., no longer carry network traffic), as indicated by the dashed line in FIG. 1B.

After network device 103 is communicatively coupled to network device 102 over communication channel 132, end station 182 requests network device 103 for an IP address. Network device 103 sends the IP address request to network device 102. In response to receiving the IP address request, IP allocator 155 determines that the next available IP address in IP pool 157 is IP address 1.1.1.2. Accordingly, IP allocator 155 selects IP address 1.1.1.2 and allocates it to end station 182 by sending it to network device 103.

IP allocator 155 updates the local IP record to reflect that IP address 1.1.1.2 has been allocated. This is shown in FIG. 1B as "~~1.1.1.2~~" in IP pool 157. IP allocator 155 sends IP pool sync message(s) (containing IP address 1.1.1.2) as part of ICR messages 141 to inform IP allocator 115 that IP address 1.1.1.2 has been allocated. IP allocator 115 updates its local IP pool record to reflect that IP address 1.1.1.2 has been allocated. This is shown in FIG. 1B as "~~1.1.1.2~~" in IP pool 117. At this point, IP pools 117 and 157 are synced up, both containing unallocated IP addresses 1.1.1.3-1.1.1.4, as reflected by their respective IP pool records. Further, end station 182 has been assigned IP address 1.1.1.2.

The network configuration of FIGS. 1A and 1B are shown for illustrative purposes, and not limitation. FIGS. 1A and 1B illustrate ICR system 100 as having two ICR devices (network device 101 and 102). It will be appreciated, however, that ICR system 100 is not so limited, and the present invention equally applies to ICR systems having three or more ICR devices. Further, although FIGS. 1A and 1B illustrate ICR system 100 communicatively coupled to one network device 103, it will also be appreciated that the present invention is not limited to one such network device.

Figure 2A:
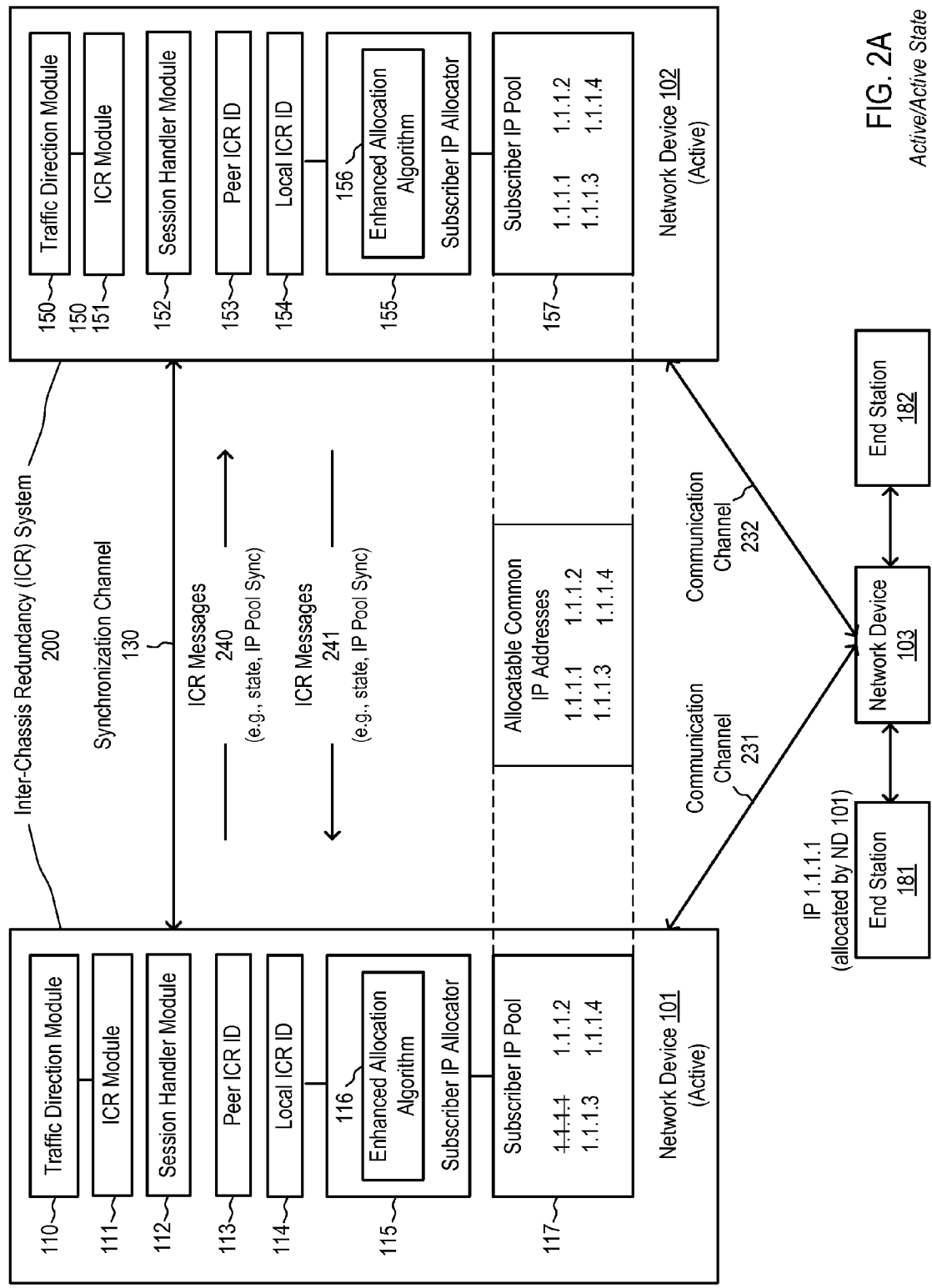
FIG. 2A is a block diagram illustrating an inter-chassis redundancy (ICR) system according to one embodiment.
Figure 2B:
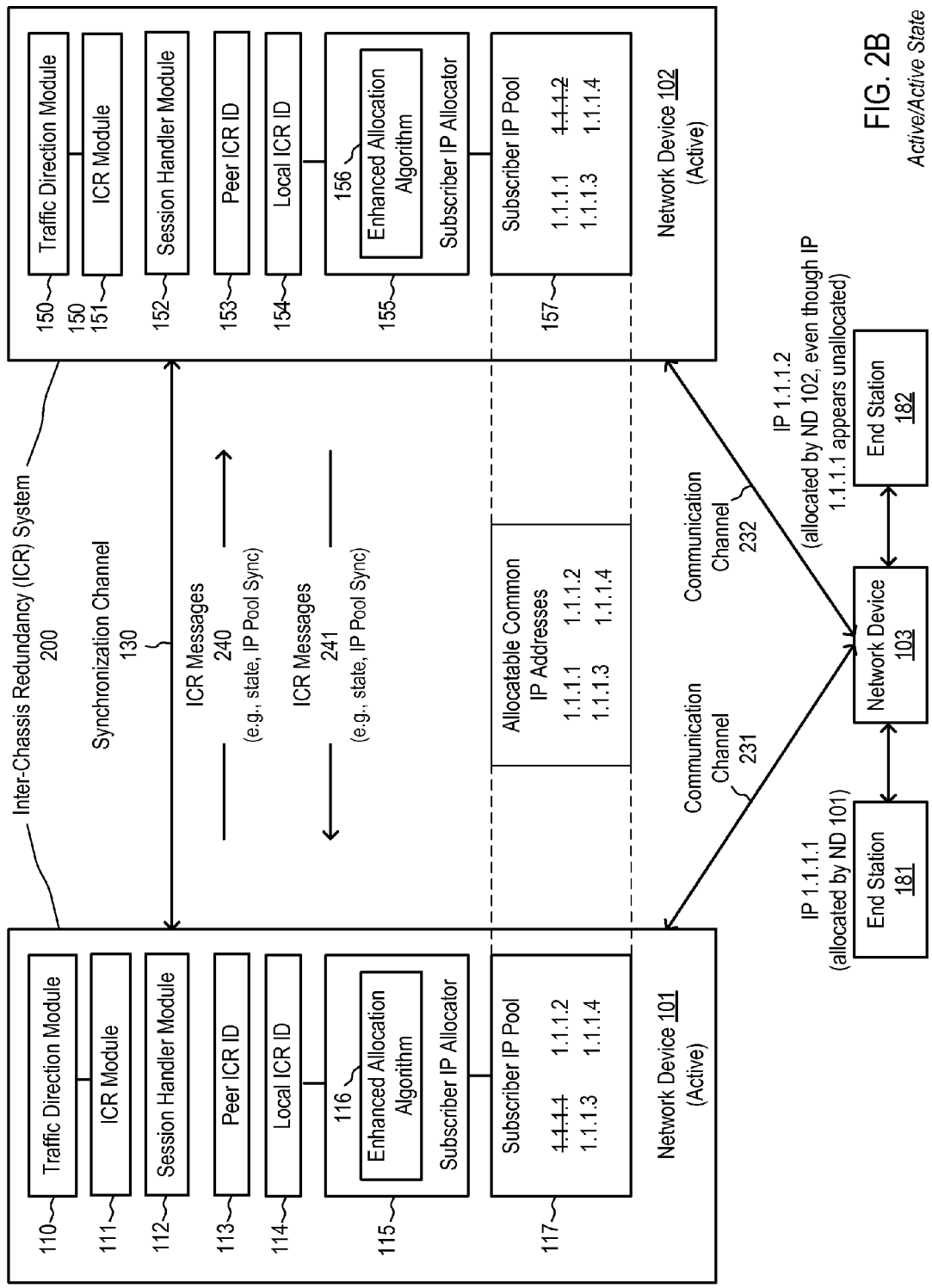
FIG. 2B is a block diagram illustrating an inter-chassis redundancy (ICR) system according to one embodiment.

FIGS. 2A and 2B are block diagrams illustrating ICR system 200 according to one embodiment. ICR system 200 is similar to ICR system 100. For the sake of brevity, the operations of the various modules of network devices 101 and 102 will not be discussed again here. In ICR system 200, however, both network devices 101 and 102 have been configured as active ICR devices. This is configuration shall herein be referred to as the active/active state configuration. FIG. 2A illustrates IP allocation by network device 101, and FIG. 2B illustrates IP allocation by network device 102. The active/active state is typically a result of a system administrator committing an error during configuration of the ICR system. The IP allocation performed by network devices 101 and 102 during the active/active state (as illustrated in FIGS. 2A and 2B) shall be discussed below in the text describing FIG. 3.

Figure 3:
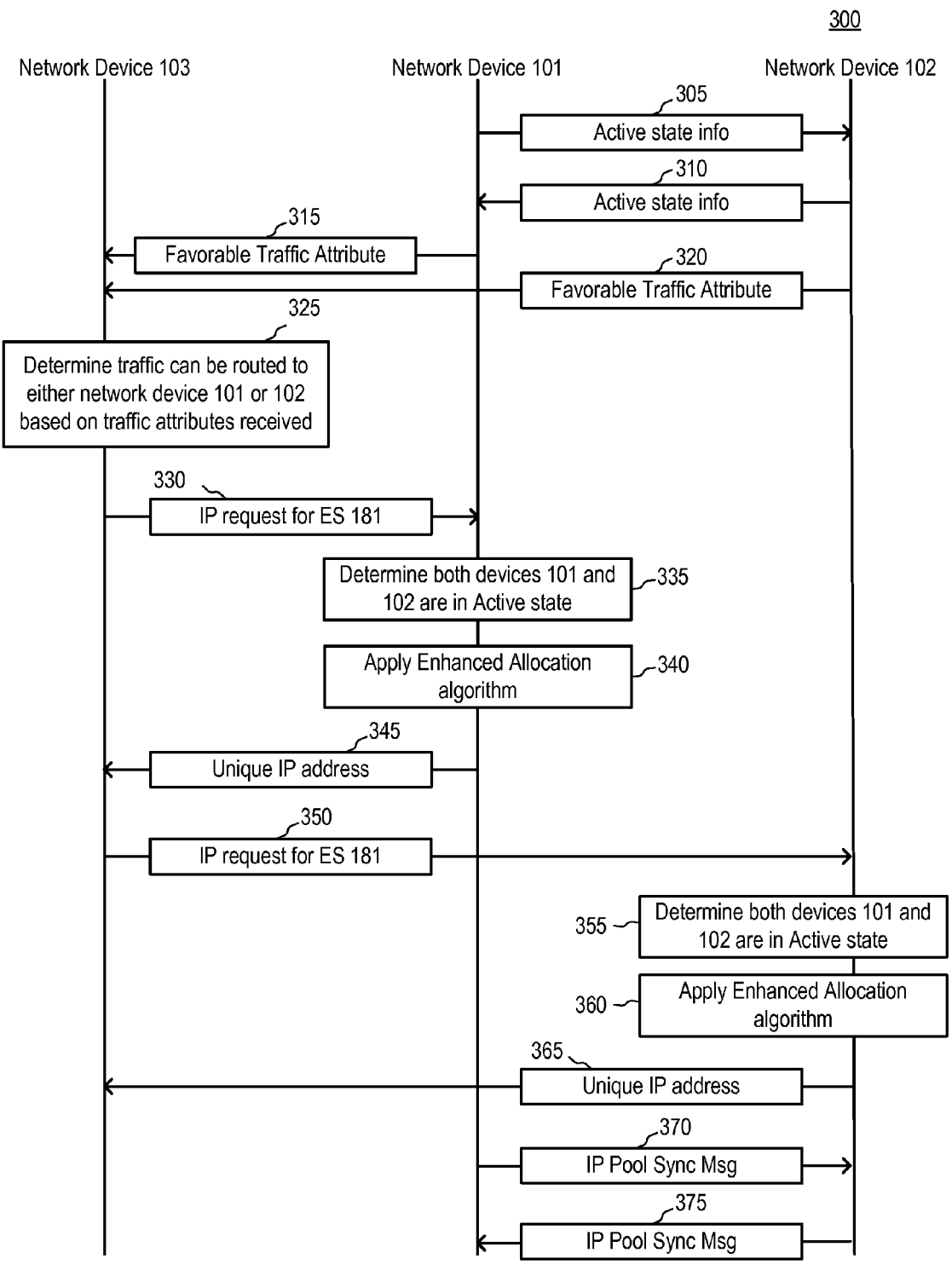
FIG. 3 is a transaction diagram illustrating a process flow for allocating IP addresses according to one embodiment.

FIG. 3 is a transaction diagram illustrating process flow 300 for allocating unique IP addresses when ICR system 200 is in active/active state, according to one embodiment. Process flow 300 assumes that network devices 101 and 102 have both been configured to serve as active ICR devices. Process flow 300 will now be discussed with reference to FIGS. 2A and 2B.

Referring now to FIG. 3, at transaction 305, network device 101 sends ICR state information to network device 102. For example, ICR module 111 sends local ICR ID 114, active ICR state, etc. as part of ICR messages 240 over synchronization channel 130 to network device 102. At transaction 310, network device 101 sends ICR state information to network device 102. For example, ICR module 151 sends local ICR ID 154, active ICR state, etc. as part of ICR messages 241 over synchronization channel 130 to network device 101.

At transaction 315, network device 101 sends favorable traffic attributes to network device 103 in an attempt to influence network device 103 to route network traffic to network device 101. For example, ICR module 111 causes traffic direction module 110 to send favorable traffic attributes to network device 103. At transaction 320, network device 102 sends favorable traffic attributes to network device 103 in an attempt to influence network device 103 to route network traffic to network device 102. For example, ICR module 151 causes traffic direction module 150 to send favorable traffic attributes to network device 103.

At transaction 325, network device 103 determines based on the received traffic attributes that network traffic can be routed to either network device 101 or 102. As a result, network device 103 establishes communication channels 231 and 232 with network devices 101 and 102, respectively. Network device 103 receives an IP address request from end station 181, and at transaction 330, sends the IP address request for end station 181 to network device 101 over communication channel 231.

Conventionally, when an active ICR device receives an IP address request, the active ICR device simply selects the next available IP address in a local IP pool and allocates it. In an active/active state, however, simply allocating the next available IP address is problematic, as illustrated in the following scenario. Assume that a conventional ICR system has been configured similar to ICR system 200, except that the conventional ICR system does not include enhanced allocation algorithms 116 and 156. Network device 103 sends a first IP address request to a first active ICR device (e.g., network device 101). The first active ICR device selects the next available IP address (e.g., IP address 1.1.1.1)

and allocates it. The first active ICR device updates its local IP pool record to reflect that IP address 1.1.1.1 has been allocated. The first active ICR device also attempts to sync up a second active ICR device (e.g., network device 102) by sending the allocated IP address 1.1.1.1 over a channel similar to synchronization channel 130.

Next, network device 103 sends a second IP address request. The second IP address request, however, is sent to the second active ICR device. The second IP address request is received by the second active ICR device before the second active ICR device has updated its local IP pool record. In other words, the second IP address request is received by the second active ICR device before the IP pools have synced up. This may be the result of a delay at the channel where the syncing information is sent, and/or delay in processing the syncing information by the second active ICR device. Consequently, the second active ICR device selects IP address 1.1.1.1 because it appears to be the next available IP address, and allocates it. As a result, the same IP address 1.1.1.1 is allocated to two different end stations which is problematic for IP traffic routing. Thus, a conventional ICR system in active/active state suffers from a severe limitation.

Referring now back to process flow 300, which overcomes the above described limitation by performing the operations of transactions 335-340. At transaction 335, network device 101 determines that both network devices 101 and 102 are active ICR devices, and applies an enhanced allocation algorithm at transaction 340. For example, as illustrated in FIG. 2A, IP allocator 115 applies enhanced allocation algorithm 116 to select an IP address for allocation. Enhanced allocation algorithm 116 selects an IP address from IP pool 117 that is unique and sends it to network device 103 at transaction 345. For example, network device 101 selects an odd IP address (e.g., IP address 1.1.1.1) and allocates it. As used herein, "unique" means that the IP address will not be subsequently allocated either by network device 101 or 102 to a different end station. Network device 101 updates its local IP pool record to indicate that IP address 1.1.1.1 has been allocated. This is shown in FIG. 2A as "1.1.1.1" in IP pool 117.

Network device 103 receives an IP address request from end station 182, and at transaction 350, sends the IP address request for end station 182 to network device 102 over communication channel 232. Note that the IP address request is received by network device 102 before its IP pool 157 has been synced up to IP pool 117. In other words, at this point, IP address 1.1.1.1 still appears to be unallocated in IP pool 157. This is shown as in FIG. 2B "1.1.1.1" in IP pool 157 without any strikethrough.

As described above, in response to receiving an IP address request, a conventional active ICR device simply selects that next available IP address in the local IP pool. In this example, a conventional active ICR device would have selected IP address 1.1.1.1 and allocated it because IP address 1.1.1.1 appears to be unallocated. This would result in IP address 1.1.1.1 being duplicated in multiple end stations, which is fatal to IP traffic routing.

Network device 102 overcomes this limitation by performing the operations of transactions 355-360. At transaction 355, network device 102 determines that both network devices 101 and 102 are active ICR devices, and applies an enhanced allocation algorithm at transaction 360. For example, as shown in FIG. 2B, IP allocator 155 applies enhanced allocation algorithm 156 to select an IP address for allocation. Enhanced allocation algorithm 156 selects an IP address from IP pool 157 that is unique and sends it to network device 103 at transaction 365. For example, network device 102 selects an even IP address (e.g., IP address 1.1.1.2) and allocates it, even though IP address 1.1.1.1 (erroneously) appears unallocated in IP pool 157. Network device 102 updates its local IP pool record to reflect that IP address 1.1.1.2 has been allocated (shown in FIG. 2B as "1.1.1.2" in IP pool 157).

At transaction 370, network device 101 sends IP pool sync message(s) to network device 102. For example, network device 101 includes IP address 1.1.1.1 in IP pool sync message(s) and sends them to network device 102 as part of ICR messages 240 over synchronization channel 130. At transaction 375, network device 102 sends IP pool sync message(s) to network device 101. For example, network device 102 includes IP address 1.1.1.2 in IP pool sync message(s) and sends them to network device 101 as part of ICR messages 241 over synchronization channel 130.

Note that although IP pool sync messages are sent and received after the IP address requests were received, network devices 101 and 102 are able to allocate unique IP addresses using the IP allocation mechanisms of the present invention. In other words, even before the IP pools are synced up, network device 101 is able to allocate IP addresses it knows will not be allocated by network device 102. Vice versa, even before the IP pools are synced up, network device 102 is able to allocate IP addresses it knows will not be allocated by network device 101.

Figure 4:
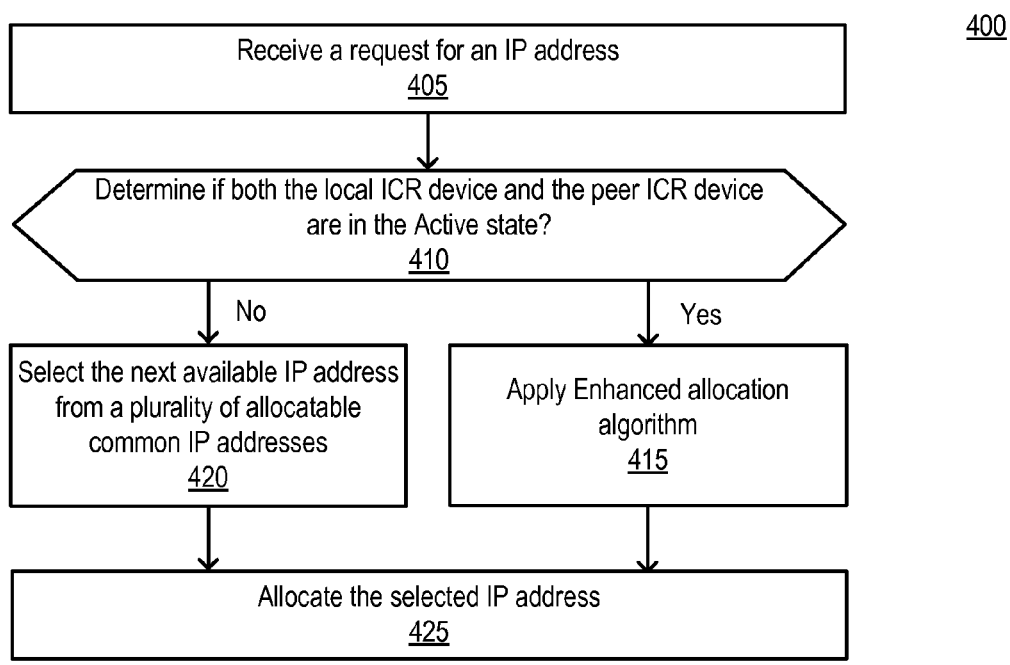
FIG. 4 is a flow diagram illustrating a method for allocating IP addresses according to one embodiment.

FIG. 4 is a flow diagram illustrating method 400 for allocating unique IP addresses according to one embodiment. For example, method 400 can be performed by network devices 101 and/or 102, both of which can be implemented as software, firmware, hardware, or any combination thereof. In the following description, "local" refers to the ICR network device which is performing method 400, and "peer" refers to the other network device of the ICR system. Method 400 will be discussed with the assumption that it is performed by network device 101 (the local ICR device). Method 400 is discussed below with reference to FIG. 2. Referring now to method 400, at block 405, network device 101 receives a request for an IP address. For example, network device 101 receives an IP address request from network device 103 over communication channel 231.

At block 410, network device 101 determines if both the local ICR device and the peer ICR device are in the active state. If so, network device 101 transitions to block 415. Otherwise, network device 101 transitions to block 420. For example, network device 101 determines if both it and network device 102 are in the active state. At block 415, network device 101 applies the enhanced allocation algorithm. For example, in response to determining that both network devices 101 and 102 are in active state, IP allocator 115 applies enhanced allocation algorithm 116 to select a unique IP address for allocation. Allocation of unique IP addresses using the enhanced allocation algorithm is further discussed below.

At block 420, in response to determining that network device 102 is not serving in the active state, network device 101 selects the next available IP address from a plurality of allocatable common IP addresses. For example, network device 101 selects IP address 1.1.1.1 from IP pool 117 because it appears to be the next available IP address in IP pool 117 based on the corresponding IP pool record. At block 425, network device 101 allocates the selected IP address, e.g., by sending it to the requesting network device.

Figure 5A:
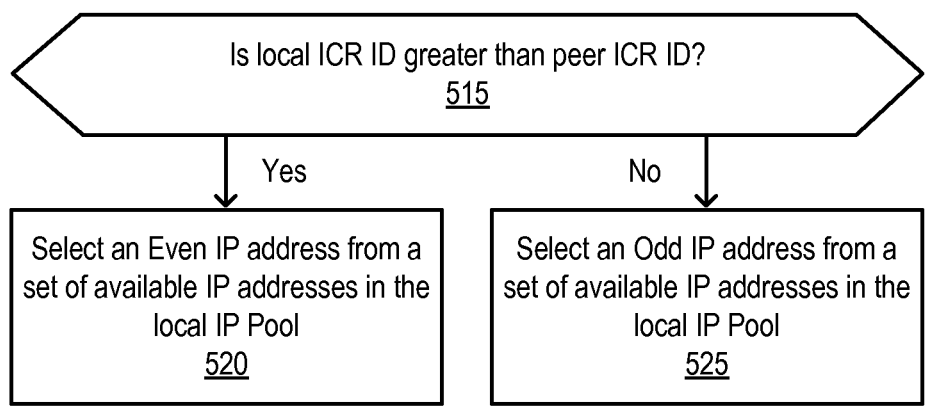
FIG. 5A is a flow diagram illustrating a method for allocating IP addresses according to one embodiment.

FIG. 5A is a flow diagram illustrating method 500 for selecting a unique IP address from an IP pool according to one embodiment. For example, method 500 can be performed by IP allocators 115 an/or 155, both of which can be implemented in software, firmware, hardware, or any combination thereof. Method 500 will be discussed with the assumption that it is performed by IP allocator 115. Method 500 assumes that some or all of method 400 has been performed. For example, method 500 can be performed as part of block 415 of method 400.

Referring now to FIG. 5A, at block 515, IP allocator 115 determines if the local ICR ID is greater than the peer ICR ID. For example, IP allocator 115 determines if local ICR ID 114 is greater than peer ICR ID 113. At block 520, in response to determining the local ICR ID is greater than the peer ICR ID, IP allocator 115 selects an even IP address from a set of available IP addresses in the local IP pool. For example, IP allocator 115 selects an even IP address from IP pool 117 that is marked as unallocated (e.g., IP address 1.1.1.2). At block 525, in response to determining the local ICR ID is not greater than the peer ICR ID, IP allocator 115 selects an odd IP address from a set of available IP addresses in the local IP pool. For example, IP allocator 115 selects an odd IP address from IP pool 117 that is marked as unallocated (e.g., IP address 1.1.1.1).

Figure 5B:
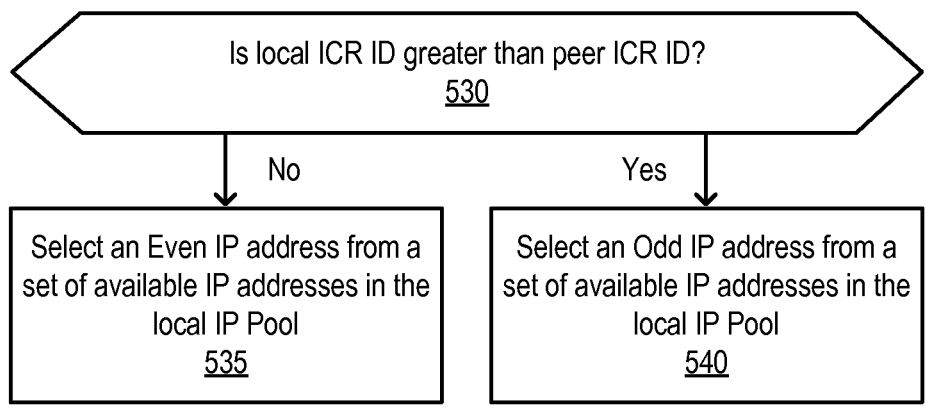
FIG. 5B is a flow diagram illustrating a method for allocating IP addresses according to one embodiment.

FIG. 5B is a flow diagram illustrating method 501 for selecting a unique IP address from an IP pool according to one embodiment. For example, method 501 can be performed by IP allocators 115 or 155, both of which can be implemented in software, firmware, hardware, or any combination thereof. Method 501 will be discussed with the assumption that it is performed by IP allocator 115. Method 501 assumes that some or all of method 400 has been performed. For example, method 501 can be performed as part of block 415 of method 400.

Referring now to FIG. 5B, at block 530, IP allocator 115 determines if the local ICR ID is greater than the peer ICR ID. For example, IP allocator 115 determines if local ICR ID 114 is greater than peer ICR ID 113. At block 535, in response to determining the local ICR ID is not greater than the peer ICR ID, IP allocator 115 selects an even IP address from a set of available IP addresses in the local IP pool. For example, IP allocator 115 selects an even IP address from IP pool 117 that is marked as unallocated (e.g., IP address 1.1.1.2). At block 540, in response to determining the local ICR ID is greater than the peer ICR ID, IP allocator 115 selects an odd IP address from a set of available IP addresses in the local IP pool. For example, IP allocator 115 selects an odd IP address from IP pool 117 that is marked as unallocated (e.g., IP address 1.1.1.1).

Figure 6A:
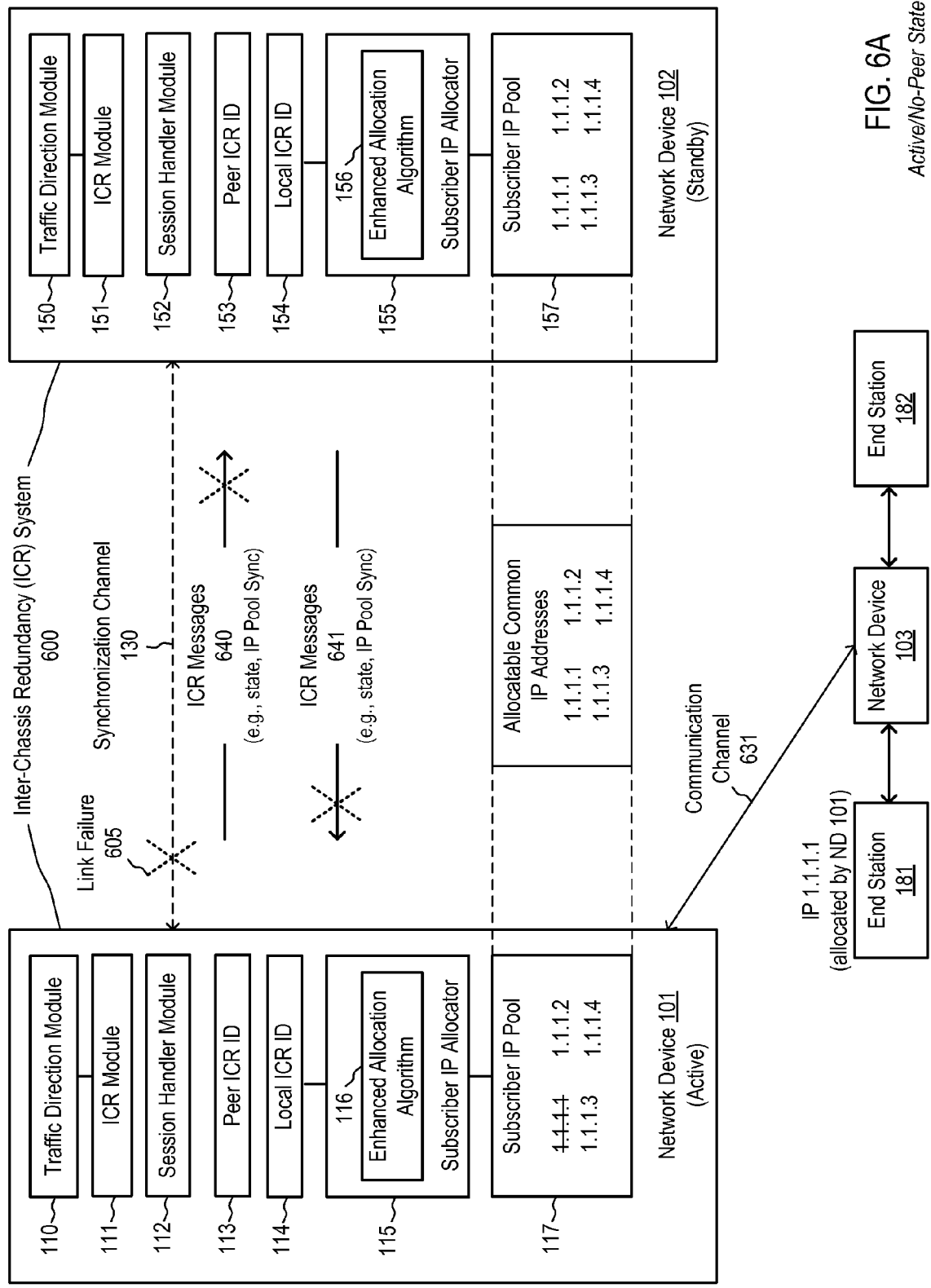
FIG. 6A is a block diagram illustrating an inter-chassis redundancy (ICR) system according to one embodiment.
Figure 6B:
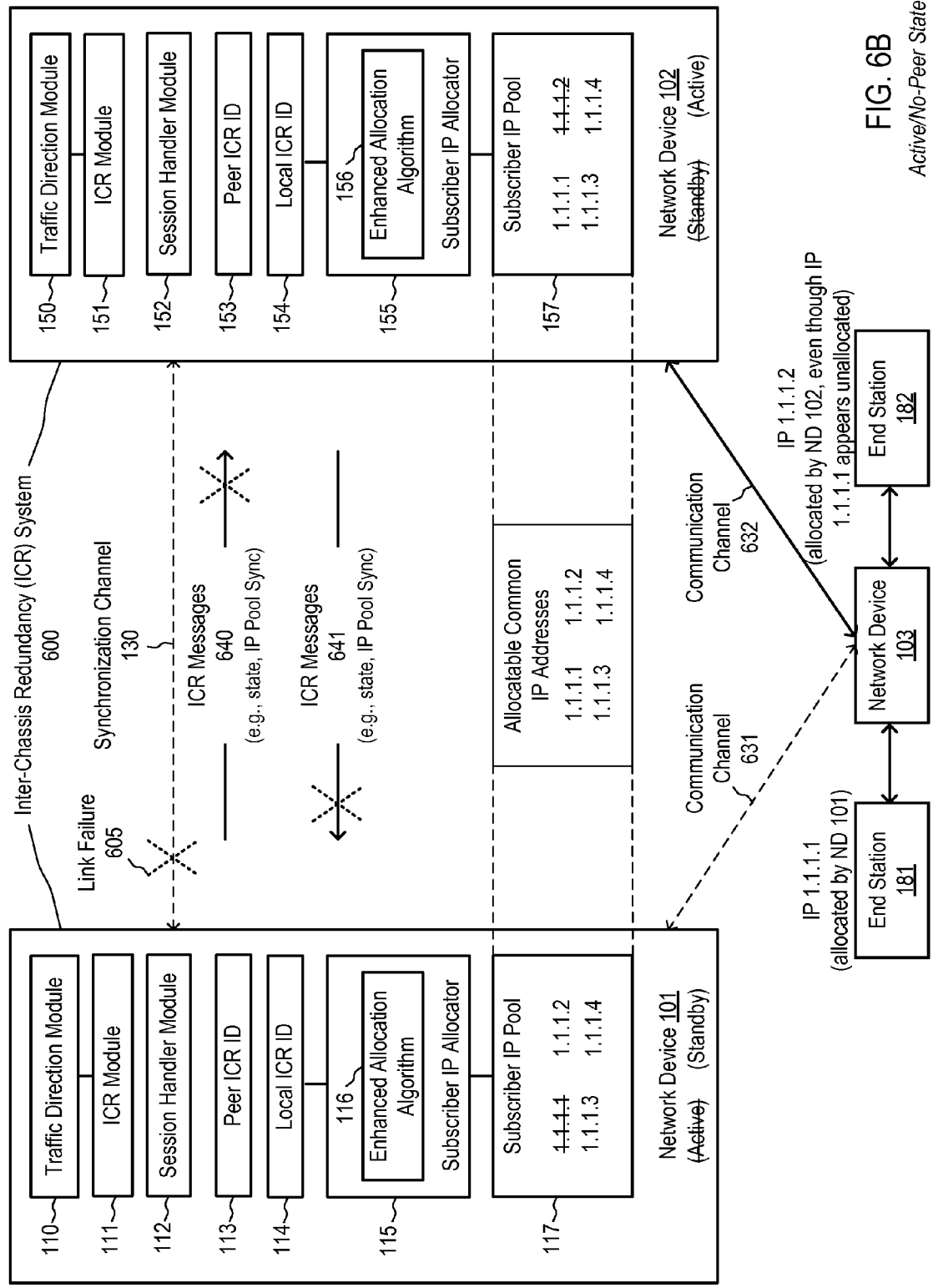
FIG. 6B is a block diagram illustrating an inter-chassis redundancy (ICR) system according to one embodiment.

FIGS. 6A and 6B are block diagrams illustrating ICR system 600 according to one embodiment. ICR system 600 is similar to ICR system 100. ICR system 600, however, suffers from link failure 605 at synchronization channel 130. This is configuration shall herein be referred to as the active/no-peer state configuration because neither network device 101 nor 102 is able to sync with each other over the failed/impaired synchronization channel 130. Thus, each ICR device appears "peerless". FIG. 6A illustrates network device 101 is initially configured to serve as the active ICR device communicatively coupled to network device 103 over communication channel 631. FIG. 6B illustrates network devices 101 and 102 have switched roles such that network device 101 now serves as the standby ICR device (shown as "(Active) (Standby)" in network device 101) and network device 102 now serves as the active ICR device (shown as "(Standby) (Active)" in network device 102). The IP allocation performed by network devices 101 and 102 during the active/no-peer state as shown in FIGS. 6A and 6B shall be discussed below in the text describing FIG. 7.

Figure 7:
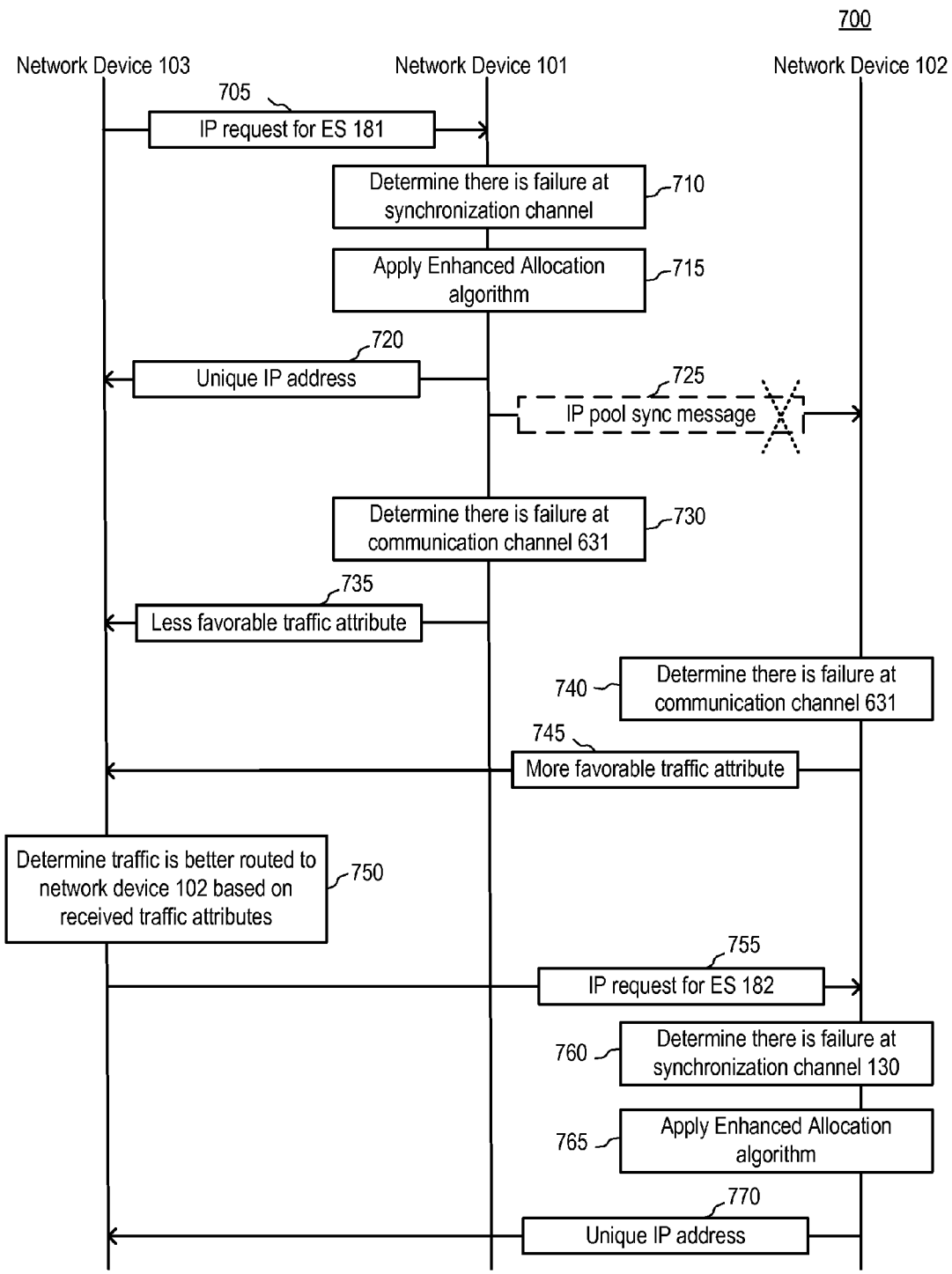
FIG. 7 is a transaction diagram illustrating a process flow for allocating IP addresses according to one embodiment.

FIG. 7 is a transaction diagram illustrating process flow 700 for allocating unique IP addresses when ICR system 600 is in active/no-peer state, according to one embodiment. Process flow 700 assumes that network device 101 is initially configured to serve as an active ICR device and network device 102 is initially configured to serve as standby ICR device. FIG. 7 also assumes that network device 103 has established communication channel 631 with network device 101. Process flow 700 will now be discussed with reference to FIGS. 6A and 6B.

Referring now to FIG. 7. At block 705, after receiving an IP address request from end station 181, network device 103 sends the IP address request to network device 101 over communication channel 631.

Conventionally, when an active ICR device receives an IP address request, the active ICR device simply selects the next available IP address in a local IP pool and allocates it. In an active/no-peer state, however, simply allocating the next available IP address is problematic, as illustrated in the following scenario. Assume that a conventional ICR system has been configured similar to ICR system 600, except that the conventional ICR system does not include enhanced allocation algorithms 116 and 156. Network device 103 sends a first IP address request to a first active ICR device (e.g., network device 101). The first active ICR device selects the next available IP address (e.g., IP address 1.1.1.1) and allocates it. The first active ICR device updates its local IP pool record to reflect that IP address 1.1.1.1 has been allocated. The first active ICR device also attempts to sync up a second active ICR device (e.g., network device 102) by sending an IP pool sync message containing the allocated IP address 1.1.1.1 over a channel similar to synchronization channel 130. The second ICR device does not, however, receive the IP pool sync message because of the link failure at the synchronization channel. Thus, the IP pools are not synced, i.e., IP address 1.1.1.1 still appears unallocated in the IP pool of the second ICR device.

Next, the ICR devices switch roles. The first ICR device switches from active to standby, and the second ICR device switches from standby to active. The ICR devices send out traffic attributes causing network device 103 to redirect network traffic to the second (now active) ICR device. Next, network device 103 sends a second IP address request. The second IP address request, however, is sent to the second active ICR device. The second IP address request is received during the time when the second ICR device is not able to sync its IP pool to the IP pool of the first ICR device due to the link failure at the synchronization channel. In other words, the second IP address request is received by the second active ICR device when IP address 1.1.1.1 still appears to be unallocated, even though IP address 1.1.1.1 has been allocated by the first ICR device. Consequently, the second active ICR device selects IP address 1.1.1.1 because it appears to be the next available IP address, and allocates it. As a result, the same IP address 1.1.1.1 is allocated to two different end stations which is problematic for IP traffic routing. Thus, a conventional ICR system in active/no-peer state suffers from a severe limitation.

Referring now back to process flow 700, which overcomes the above described limitation by performing the operations of transactions 710-715. At transaction 710, network device 101 determines that there is a link failure at the synchronization channel, and applies an enhanced allocation algorithm at transaction 715. For example, as shown in FIG. 6A, IP allocator 115 applies enhanced allocation algorithm 116 to select an IP address for allocation. Enhanced allocation algorithm 116 selects an IP address from IP pool 117 that is unique and sends it to network device 103 at transaction 720. For example, network device 101 selects an odd IP address (e.g., IP address 1.1.1.1) and allocates it. As used herein, "unique" means that the IP address will not be subsequently allocated either by network device 101 or 102 to a different end station. Network device 101 updates its local IP pool record to indicate that IP address 1.1.1.1 has been allocated. This is shown in FIG. 6A as "1.1.1.1" in IP pool 117.

At transaction 725, network device 101 sends an optional IP pool sync message to network device 102. For example, network device 101 sends IP pool sync message containing IP address 1.1.1.1 as part of ICR messages 640 to network device 102. Network device 102, however, does not receive the IP pool sync message (as indicated by the "X") because of link failure 605 at synchronization channel 130. Alternatively, network device 101 can decide not to send the IP pool sync message because network device 101 is aware that the message will not be received by network device 102 due to link failure 605.

At transaction 730, network device 101 determines that there is a failure at communication channel 631, and sends less favorable traffic attribute(s) to network device 103 at transaction 735. By sending less favorable traffic attribute as compared to traffic attributes sent by network device 102, network device 101 attempts to influence network device 103 to direct network traffic away from network device 101 and toward network device 102.

At transaction 740, network device 102 determines that there is a failure at communication channel 631, and sends more favorable traffic attribute(s) to network device 103 at transaction 745. By sending more favorable traffic attribute as compared to traffic attributes sent by network device 101, network device 102 attempts to influence network device 103 to direct network traffic away from network device 101 and toward network device 102.

At transaction 750, network device 103 determines that network traffic is better routed to network device 102 based on the received traffic attributes. As a result of such determination, network device 103 establishes communication channel 632 with network device 102 (as shown in FIG. 6B). Network device 103 receives an IP address request from end station 182, and at transaction 755, sends the IP address request to network device 102 over communication channel 632. Note that the IP address request is received by network device 102 while its IP pool 157 is out of sync with IP pool 117. In other words, at this point, IP address 1.1.1.1 still appears to be unallocated in IP pool 157. This is shown in FIG. 6B as "1.1.1.1" in IP pool 157 without any strikethrough.

As described above, in response to receiving an IP address request, a conventional active ICR device simply selects that next available IP address in the local IP pool. In this example, a conventional active ICR device would have selected IP address 1.1.1.1 and allocated it because IP address 1.1.1.1 appears to be unallocated. This would result in IP address 1.1.1.1 being duplicated in multiple end stations, which is fatal to IP traffic routing.

Network device 102 overcomes this limitation by performing the operations of transactions 760-765. At transaction 760, network device 102 determines that both network devices 101 and 102 are active ICR devices, and applies an enhanced allocation algorithm at transaction 765. For example, as shown in FIG. 6B, IP allocator 155 applies enhanced allocation algorithm 156 to select an IP address for allocation. Enhanced allocation algorithm 156 selects an IP address from IP pool 157 that is unique and sends it to network device 103 at transaction 770. For example, network device 102 selects an even IP address (e.g., IP address 1.1.1.2) and allocates it, even though IP address 1.1.1.1 (erroneously) appears unallocated in IP pool 157. Network device 102 updates its local IP pool record to reflect that IP address 1.1.1.2 has been allocated (shown in FIG. 6B as "1.1.1.2" in IP pool 157).

Note that by detecting link failure 605 at synchronization channel 130, network devices 101 and 102 are able to advantageously apply enhanced allocation algorithms 116 and 156, respectively. By applying enhanced allocation algorithms 116 and 156, network devices 101 and 102 are able to allocate unique IP addresses even though their IP pools are out of sync. For example, IP address "1.1.1.2" appears unallocated in IP pool 117 even though it has been allocated by network device 102. Further, IP address "1.1.1.1" appears unallocated in IP pool 157 even though it has been allocated by network device 101.

Figure 8:
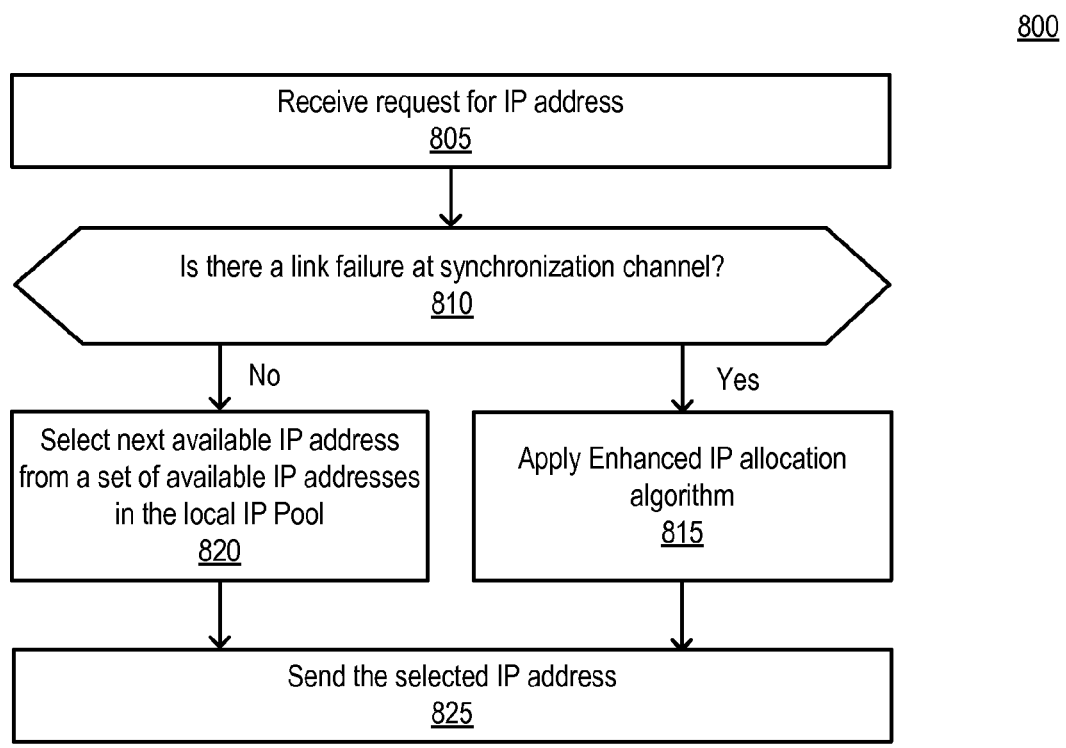
FIG. 8 is a flow diagram illustrating a method for allocating IP addresses according to one embodiment.

FIG. 8 is a flow diagram illustrating method 800 for allocating a unique IP address according to one embodiment. For example, method 800 can be performed by network devices 101 and/or 102, both of which can be implemented as software, firmware, hardware, or any combination thereof. In the following description, "local" refers to the ICR network device which is performing method 800, and "peer" refers to the other network device of the ICR system. Method 800 will be discussed with the assumption that it is performed by network device 101 (the local ICR device). Method 800 is discussed below with reference to FIG. 6. Referring now to method 800, at block 805, network device 101 receives a request for an IP address. For example, network device 101 receives an IP address request from network device 103 over communication channel 231.

At block 810, network device 101 determines if there is a link failure at the synchronization channel. If so, network device 101 transitions to block 815. Otherwise, network device 101 transitions to block 820. For example, network device 101 determines if a link failure such as link failure 605 exists at synchronization channel 130. At block 815, network device 101 applies the enhanced allocation algorithm. For example, in response to determining that link failure 605 exists at synchronization channel 130, IP allocator 115 applies enhanced allocation algorithm 116 to select a unique IP address for allocation. Various embodiments of block 815 have been discussed above, for example, in the text relating to FIGS. 5A and 5B.

At block 820 network device 101 selects the next available IP address from a plurality of allocatable common IP addresses. For example, in response to determining that there is no link failure at synchronization channel 130, network device 101 selects IP address 1.1.1.1 from IP pool 117 because it appears to be the next available IP address in IP pool 117 based on the corresponding IP pool record. At block 825, network device 101 allocates the selected IP address, e.g., by sending it to the requesting network device.

Figure 9A:
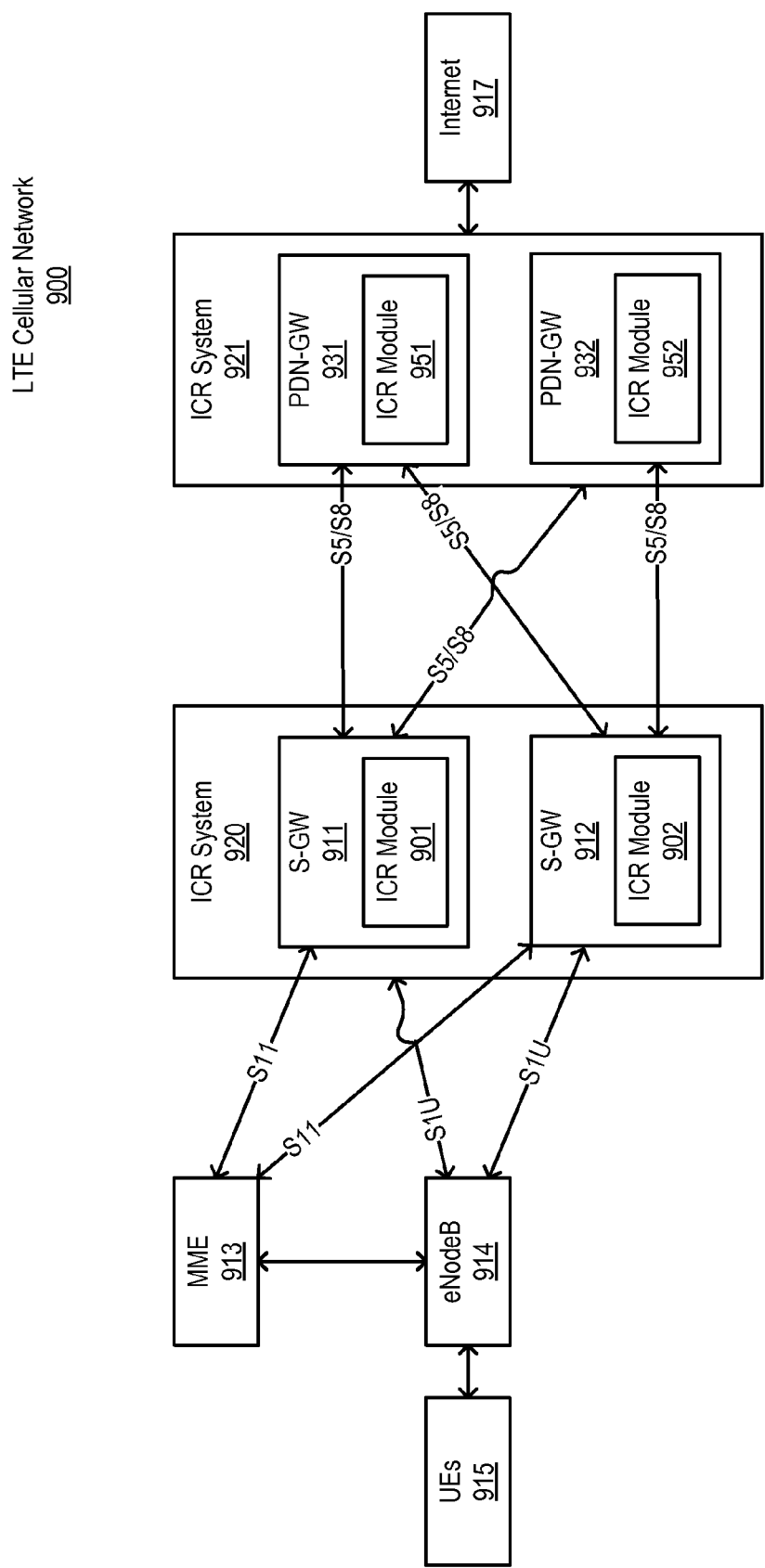
FIG. 9A is a block diagram illustrating a $3^{rd}$ Generation Partnership Project (3GPP) Long Term Evolution (LTE) cellular network for implementing an ICR system according to one embodiment.
Figure 9B:
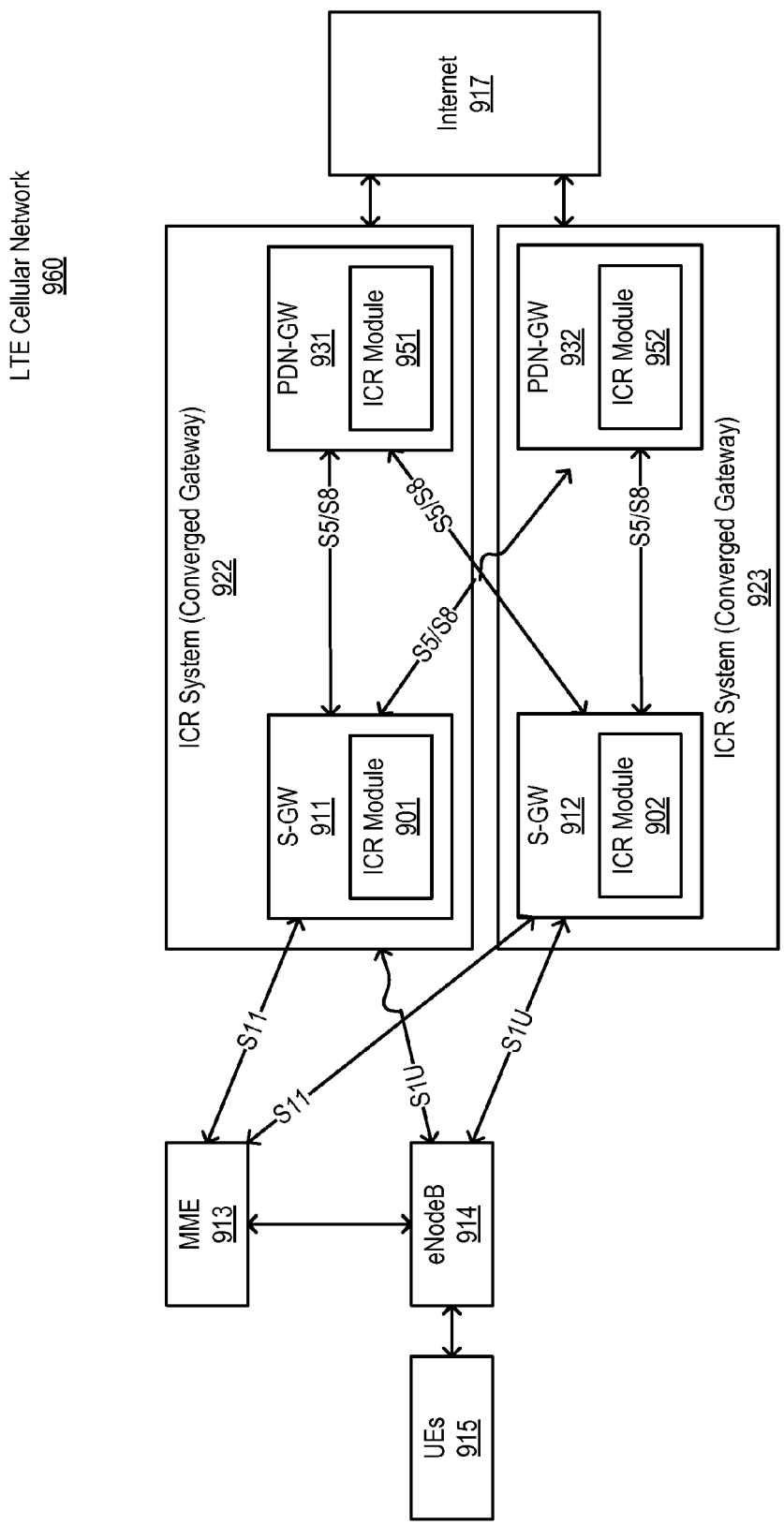
FIG. 9B is a block diagram illustrating a $3^{rd}$ Generation Partnership Project (3GPP) Long Term Evolution (LTE) cellular network for implementing an ICR system according to one embodiment.

FIG. 9A is a block diagram a 3rd Generation Partnership Project (3GPP) Long Term Evolution (LTE) cellular network 900 according to one embodiment. User devices or equipment (UE) 915 (e.g., mobile phones, laptops, and other wireless devices) establish wireless connections with network 900 through eNodeB 914. eNodeB 914 represents the LTE network base station. Although one eNodeB is shown, there often may be other base stations. The user data (e.g., IP packets) from/to UE 915 can be handled by two different types of LTE network entities, referred to as a Serving Gateway (S-GW) (e.g., S-GWs 911-912) and a Packet Data Network Gateway (PDN-GW) (e.g., PDN-GWs 921-922). The S-GW and the PDN-GW are subcomponents of the System Architecture Evolution (SAE) which represents the core network architecture of LTE. The main component or core of the SAE is known as the SAE core or Evolved Packet Core (EPC). The S-GW and PDN-GW are logically separated entities according to LTE, although they may be physically deployed on either one or more physical network devices/chassis. As illustrated in FIG. 9A, the S-GW and PDN-GW are implemented as separate network devices. For example, ICR system 920 includes SG-Ws 911-912, and ICR system 921 includes PDN-GWs 931-932. In will be appreciated, however, that the SG-Ws and PDN-GWs can be implemented as a single network device. For example, S-GW 911 and PDN-GW 931 can be implemented as a single network device, e.g., a converged gateway (C-GW), which makes up a first ICR network device of an ICR system. For example, this is shown as ICR system 922 of FIG. 9B. S-GW 912 and PDN-GW 932 can be implemented as a second C-GW, which makes up a second ICR network device of the ICR system. For example, this is shown in FIG. 9B as ICR system 923.

As illustrated, S-GWs 911-912 are implemented as part of ICR system 920. Each of S-GWs 911-912 is communicatively coupled to eNodeB 914 by a respective user plane interface (S1U). These interfaces handle the per-bearer user plane tunneling and inter eNodeB path switching during handover. In one embodiment, the transport protocol over these interfaces is GPRS Tunneling Protocol-User plane (GTP-U). S-GWs 911-912 can receive user data over the S1U interfaces, and also buffer downlink IP packets destined for UE 915. Each of S-GWs 911-912 is communicatively coupled to PDN-GWs 931-932 by a respective S5/S8 interface. The S5/S8 interfaces can provide user plane tunneling and tunnel management between S-GWs 911-912 and PDN-GWs 931-932. Each of S-GWs 911-912 is communicatively coupled to Mobility Management Entity (MME) 913 by a respective S11 interface. PDN-GWs 931-932 can serve as gateways towards external IP networks (e.g., the Internet) 917. PDN-GWs 931-932 can also include logic for IP address allocation, charging, packet filtering, policy-based control of flows, etc. Network 900 can include other network elements, such as one or more routers between eNodeB 914 and S-GWs 911-912, between S-GWs 911-912 and PDN-GWs 931-932, and/or between PDN-GWs 931-932 and the Internet.

In the illustrated embodiment, S-GWs 911-912 form ICR system 920, although the scope of the invention is not so limited. In some embodiments, S-GWs 911-912 can be at different geographical locations to provide geographically distributed redundancy. S-GW 911 includes ICR module 901 and S-GW 912 includes ICR module 902. ICR modules 901-902 can be similar to or the same as those described elsewhere herein and/or can perform methods similar to or the same as those described elsewhere herein. For example, ICR modules 901-902 can perform operations similar to those performed by network devices 101 and/or 102.

In the illustrated embodiment, PDN-GWs 931-932 form ICR system 921, although the scope of the invention is not so limited. In some embodiments, PDN-GWs 931-932 can be at different geographical locations to provide geographically distributed redundancy. PDN-GW 931 includes ICR module 951 and PDN-GW 932 includes ICR module 952. ICR modules 951 and 952 can be similar to or the same as those described elsewhere herein and/or can perform methods similar to or the same as those described elsewhere herein. For example, ICR modules 951-952 can perform operations similar to those performed by network devices 101 and/or 102.

In other embodiments, two or more other types of network elements of a cellular or other network, may have ICR modules and perform methods disclosed herein. Embodiments are applicable to various different types of Layer 2 or Layer 3 network elements in various different types of networks where providing ICR is desired.

FIG. 9B is a block diagram a 3GPP LTE cellular network 960 according to one embodiment. Network 960 is similar to network 900 of FIG. 9A except that S-GW 911 and PDN-GW 931 are implemented as a single C-GW, and S-GW 912 and PDN-GW 932 are implemented as a single C-GW.

Figure 10:
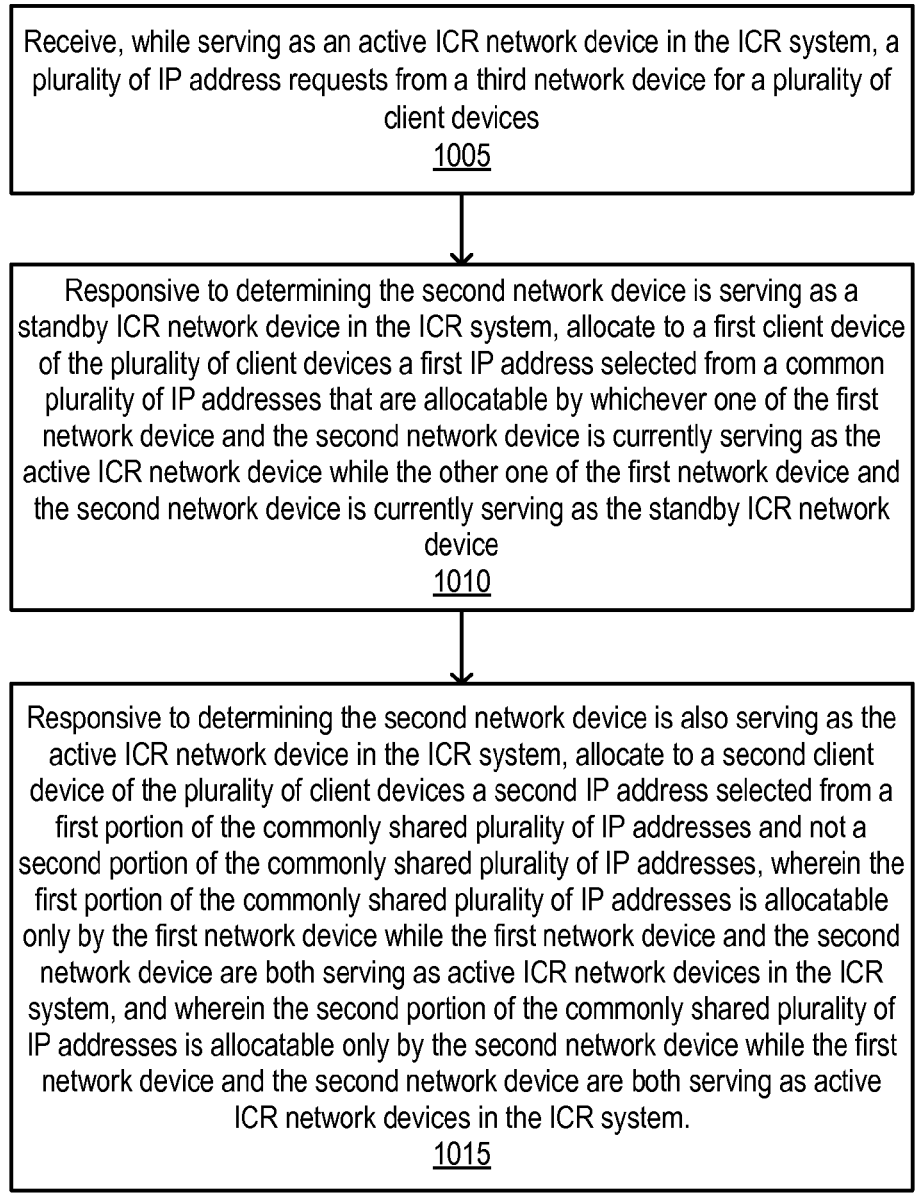
FIG. 10 is a flow diagram illustrating a method for allocating IP addresses according to one embodiment.

FIG. 10 is a flow diagram illustrating method 1000 for allocating IP addresses according to one embodiment. For example, method 1000 can be performed by network device 101 and/or network device 102, both of which can be implemented in software, firmware, hardware, or any combination thereof. Method 1000 is discussed below with the assumption that it is performed by network device 101. Method 1000 is discussed with reference to FIGS. 1 and 2.

Referring now to FIG. 10, at block 1005, network device 101 receives, while serving as an active ICR network device in the ICR system, a plurality of IP address requests from the third network device for plurality of client devices. For example, network device 101 receives IP address requests from network device 103 for end stations 181-182 over communication channels 131 or 231.

At block 1010, responsive to determining the second network device is serving as a standby ICR network device in the ICR system, network device 101 allocates to a first client device of the plurality of client devices a first IP address selected from a common plurality of IP addresses that are allocatable by whichever one of the first network device and the second network device is currently serving as the active ICR network device while the other one of the first network device and the second network device is currently serving as the standby ICR network device. For example, network device 101 determines that network device 102 is serving as a standby ICR device (as illustrated in FIG. 1) and selects the next available IP address from IP pool 117 (e.g., IP address 1.1.1.1) and allocates it to end station 181.

At block 1015, responsive to determining the second network device is also serving as the active ICR network device in the ICR system, network device 101 allocates to a second client device of the plurality of client devices a second IP address selected from a first portion of the commonly shared plurality of IP addresses and not a second portion of the commonly shared plurality of IP addresses, wherein the first portion of the commonly shared plurality of IP addresses is allocatable only by the first network device while the first network device and the second network device are both serving as active ICR network devices in the ICR system, and wherein the second portion of the commonly shared plurality of IP addresses is allocatable only by the second network device while the first network device and the second network device are both serving as active ICR network devices in the ICR system. For example, network device 101 determines that network device 102 is also serving as the active ICR network device (as illustrated in FIG. 2) and applies enhanced allocation algorithm 116 to select a unique IP address from IP pool 117 (e.g., an odd IP address such as IP address 1.1.1.1) and allocates it to end station 181.

Figure 11:
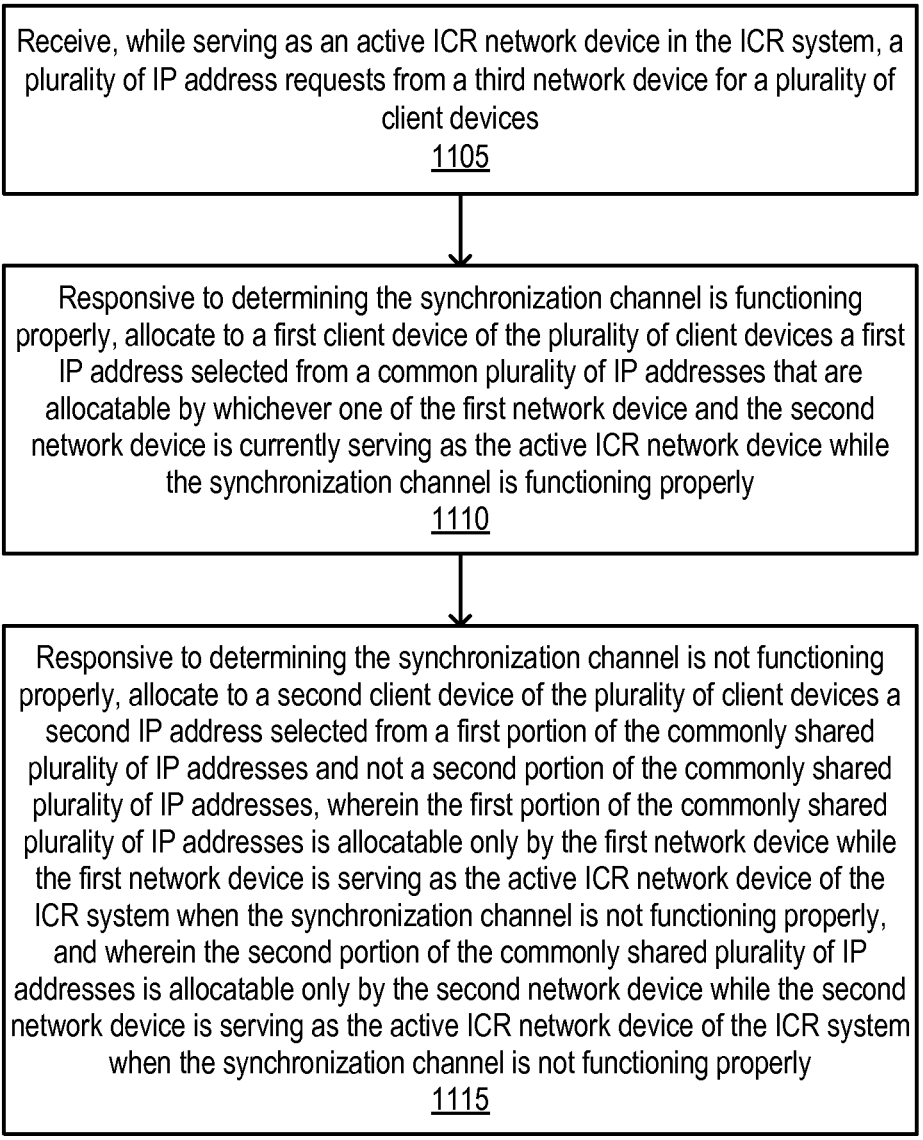
FIG. 11 is a flow diagram illustrating a method for allocating IP addresses according to one embodiment.

FIG. 11 is a flow diagram illustrating method 1100 for allocating IP addresses according to one embodiment. For example, method 1100 can be performed by network device 101 and/or network device 102, both of which can be implemented in software, firmware, hardware, or any combination thereof. Method 1100 is discussed below with the assumption that it is performed by network device 101. Method 1100 is discussed with reference to FIGS. 1 and 6.

Referring now to FIG. 11, at block 1105, network device 101 receives, while serving as an active ICR network device in the ICR system, a plurality of IP address requests from the third network device for plurality of client devices. For example, network device 101 receives IP address requests from network device 103 for end stations 181-182 over communication channels 131 or 631.

At block 1110, responsive to determining the synchronization channel is functioning properly, network device 101 allocates to a first client device of a plurality of client devices a first IP address selected from a common plurality of IP addresses that are allocatable by whichever one of the first network device and the second network device is currently serving as the active ICR network device while the synchronization channel is functioning properly. For example, network device 101 determines that synchronization channel 130 is functioning properly (as illustrated in FIG. 1) and selects the next available IP address from IP pool 117 (e.g., IP address 1.1.1.1) and allocates it to end station 181.

At block 1115, responsive to determining the synchronization channel is not functioning properly, network device 101 allocates to a second client device of the plurality of client devices a second IP address selected from a first portion of the commonly shared plurality of IP addresses and not a second portion of the commonly shared plurality of IP addresses, wherein the first portion of the commonly shared plurality of IP addresses is allocatable only by the first network device while the first network device is serving as the active ICR network device of the ICR system when the synchronization channel is not functioning properly, and wherein the second portion of the commonly shared plurality of IP addresses is allocatable only by the second network device while the second network device is serving as the active ICR network device of the ICR system when the synchronization channel is not functioning properly. For example, network device 101 determines that synchronization channel 130 is not functioning properly (as illustrated in FIG. 6) and applies enhanced allocation algorithm 116 to select a unique IP address from IP pool 117 (e.g., an odd IP address such as IP address 1.1.1.1) and allocates it to end station 181.

The above description and figures reference IP addresses. It will be appreciated that the present application is applicable to both IPv4 and IPv6 addresses.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device of an inter-chassis redundancy (ICR) system that is communicatively coupled to a second network device of the ICR system, the ICR system communicatively coupled to a third network device, the third network device communicatively coupled to a plurality of client devices, the method comprising:
    receiving, while serving as an active ICR network device in the ICR system, a plurality of Internet Protocol (IP) address requests from the third network device for the plurality of client devices;
    responsive to determining the second network device is serving as a standby ICR network device in the ICR system, allocating to a first client device of the plurality of client devices a first IP address selected from a common plurality of IP addresses that are allocatable by whichever one of the first network device and the second network device is currently serving as the active ICR network device while the other one of the first network device and the second network device is currently serving as the standby ICR network device; and
    responsive to determining the second network device is also serving as the active ICR network device in the ICR system, allocating to a second client device of the plurality of client devices a second IP address selected from the common plurality of IP addresses, wherein the second IP address is selected based on a result of a comparison of a first identifier (ID) identifying the first network device with a second ID identifying the second network device.

2. The method of claim 1, wherein the second IP address is selected from one or more odd IP addresses when the first ID identifying the first network device is not greater than the second ID identifying the second network device.

3. The method of claim 1, wherein the second IP address is selected from one or more odd IP addresses when the second ID identifying the second network device is not greater than the first ID identifying the first network device.

4. The method of claim 1, wherein allocating the third network device the second IP address comprises allocating the third network device the second IP address at a converged gateway (C-GW).

5. The method of claim 1, wherein allocating the third network device the second IP address comprises allocating the third network device the second IP address at a packet data network gateway (PDN-GW).

6. A first network device of an inter-chassis redundancy (ICR) system that is communicatively coupled to a second network device of the ICR system, the ICR system communicatively coupled to a third network device, the third network device communicatively coupled to a plurality of client devices, the first network device comprising:
    a set of one or more processors; and
    a non-transitory machine-readable storage medium containing code, which when executed by the set of one or more processors, causes the first network device to:
        receive, while serving as an active ICR network device in the ICR system, a plurality of Internet Protocol (IP) address requests from the third network device for the plurality of client devices,
        responsive to determining the second network device is serving as a standby ICR network device in the ICR system, allocate to a first client device of the plurality of client devices a first IP address selected from a common plurality of IP addresses that are allocatable by whichever one of the first network device and the second network device is currently serving as the active ICR network device while the other one of the first network device and the second network device is currently serving as the standby ICR network device, and
        responsive to determining the second network device is also serving as the active ICR network device in the ICR system, allocate to a second client device of the plurality of client devices a second IP address selected from the common plurality of IP addresses, wherein the second IP address is selected based on a result of a comparison of a first identifier (ID) identifying the first network device with a second ID identifying the second network device.

7. The first network device of claim 6, wherein the second IP address is selected from one or more odd IP addresses when the first ID identifying the first network device is not greater than the second ID identifying the second network device.

8. The first network device of claim 6, wherein the second IP address is selected from or more odd IP addresses when the second ID identifying the second network device is not greater than the first ID identifying the first network device.

9. The first network device of claim 6, wherein the first network device comprises a converged gateway (C-GW).

10. The first network device of claim 6, wherein the first network device comprises a packet data network gateway (PDN-GW).

11. A method in a first network device of an inter-chassis redundancy (ICR) system that is communicatively coupled to a second network device of the ICR system over a synchronization channel, the ICR system communicatively coupled to a third network device, the third network device communicatively coupled to a plurality of client devices, the method comprising:
    receiving, while serving as an active ICR network device in the ICR system, a plurality of Internet Protocol (IP) address requests from the third network device for the plurality of client devices;
    responsive to determining the synchronization channel is functioning properly, allocating to a first client device of the plurality of client devices a first IP address selected from a common plurality of IP addresses that are allocatable by whichever one of the first network device and the second network device is currently serving as the active ICR network device while the synchronization channel is functioning properly; and
    responsive to determining the synchronization channel is not functioning properly, allocating to a second client device of the plurality of client devices a second IP address selected from the common plurality of IP addresses wherein the second IP address is selected based on a result of a comparison of a first identifier (ID) identifying the first network device and with a second ID identifying the second network device when the synchronization channel is not functioning properly.

12. The method of claim 11, wherein second IP address is selected from one or more odd IP addresses when the first ID identifying the first network device is not greater than the second ID identifying the second network device.

13. The method of claim 11, wherein the second IP address is selected one or more odd IP addresses when the second ID identifying the second network device is not greater than the first ID identifying the first network device.

14. The method of claim 11, wherein allocating the third network device the second IP address comprises allocating the third network device the second IP address at a converged gateway (C-GW).

15. The method of claim 11, wherein allocating the third network device the second IP address comprises allocating the third network device the second IP address at a packet data network gateway (PDN-GW).

16. A first network device of an inter-chassis redundancy (ICR) system that is communicatively coupled to a second network device of the ICR system over a synchronization channel, the ICR system communicatively coupled to a third network device, the third network device communicatively coupled to a plurality of client devices, the first network device comprising:
   a set of one or more processors; and
   a non-transitory machine-readable storage medium containing code, which when executed by the set of one or more processors, causes the first network device to:
      receive, while serving as an active ICR network device in the ICR system, a plurality of Internet Protocol (IP) address requests from the third network device for the plurality of client devices,
      responsive to determining the synchronization channel is functioning properly, allocate to a first client device of the plurality of client devices a first IP address selected from a common plurality of IP addresses that are allocatable by whichever one of the first network device and the second network device is currently serving as the active ICR network device while the synchronization channel is functioning properly, and
      responsive to determining the synchronization channel is not functioning properly, allocate to a second client device of the plurality of client devices a second IP address selected from the common plurality of IP addresses wherein the second IP address is selected based on a result of a comparison of a first identifier (ID) identifying the first network device and with a second ID identifying the second network device when the synchronization channel is not functioning properly.

17. The first network device of claim 16, wherein the second IP address is selected from one or more odd IP addresses when the first ID identifying the first network device is not greater than the second ID identifying the second network device.

18. The first network device of claim 16, wherein the second IP address is selected one or more odd IP addresses when the second ID identifying the second network device is not greater than the first ID identifying the first network device.

19. The first network device of claim 16, wherein the first network device comprises a converged gateway (C-GW).

20. The first network device of claim 16, wherein the first network device comprises a packet data network gateway (PDN-GW).

* * * * *